United States Patent
Araki et al.

[11] Patent Number: 6,092,098
[45] Date of Patent: Jul. 18, 2000

[54] METHOD AND COMPUTER PROGRAM PRODUCT FOR CONTROLLING DISTRIBUTED-MEMORY MULTIPROCESSOR SYSTEM

[75] Inventors: Hiroyuki Araki; Kosuke Tatsukawa, both of Tokyo, Japan

[73] Assignee: NEC Corporation, Tokyo, Japan

[21] Appl. No.: 09/121,826

[22] Filed: Jul. 24, 1998

[30] Foreign Application Priority Data

Jul. 25, 1997 [JP] Japan ..................................... 9-215925

[51] Int. Cl.[7] ...................................................... G06F 13/00
[52] U.S. Cl. .......................................................... 709/201
[58] Field of Search ........................ 364/DIG. 1, DIG. 2; 709/100, 102, 104, 105, 106–201; 708/446; 712/28; 717/6

[56] References Cited

U.S. PATENT DOCUMENTS

| | | | |
|---|---|---|---|
| 5,392,429 | 2/1995 | Agrawal et al. | 708/446 |
| 5,613,136 | 3/1997 | Casavant et al. | 712/28 |
| 5,832,272 | 11/1998 | Kalantery | 717/6 |

FOREIGN PATENT DOCUMENTS

| | | |
|---|---|---|
| 5-20107 | 1/1993 | Japan . |
| 6-44087 | 2/1994 | Japan . |
| 6-110841 | 4/1994 | Japan . |
| 6-149747 | 5/1994 | Japan . |

*Primary Examiner*—Robert B. Harrell
*Attorney, Agent, or Firm*—Foley & Lardner

[57] ABSTRACT

Disclosed is a method for controlling a distributed-memory multiprocessor system having a plurality of nodes mutually connected by a network, each of the nodes having a CPU and a memory, and a plurality of user tasks which belong to the same application and are executed in different nodes, which method comprises the steps of: (a) assigning a transmission resource of a network interface in the node to a user task that will be executed next and starting the execution of the user task when a context switching operation is performed; (b) reading data written by the user task from the transmission resource, adding to the data a communication identifier that is assigned to an application to which the user task belongs and that identifies a data reception area, and transmitting the resultant data to a reception side node through the network, in the network interface of each transmission side node; and (c) selecting a data reception area for storing data received from another node from a plurality of data receiving areas on the basis of the communication identifier added to the received data and storing the received data in the selected data reception area, in the network interface of each reception side node.

20 Claims, 22 Drawing Sheets

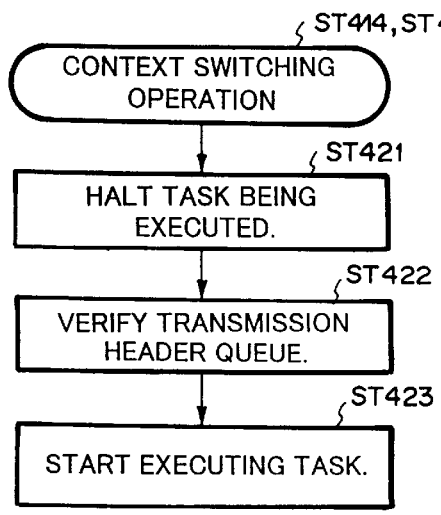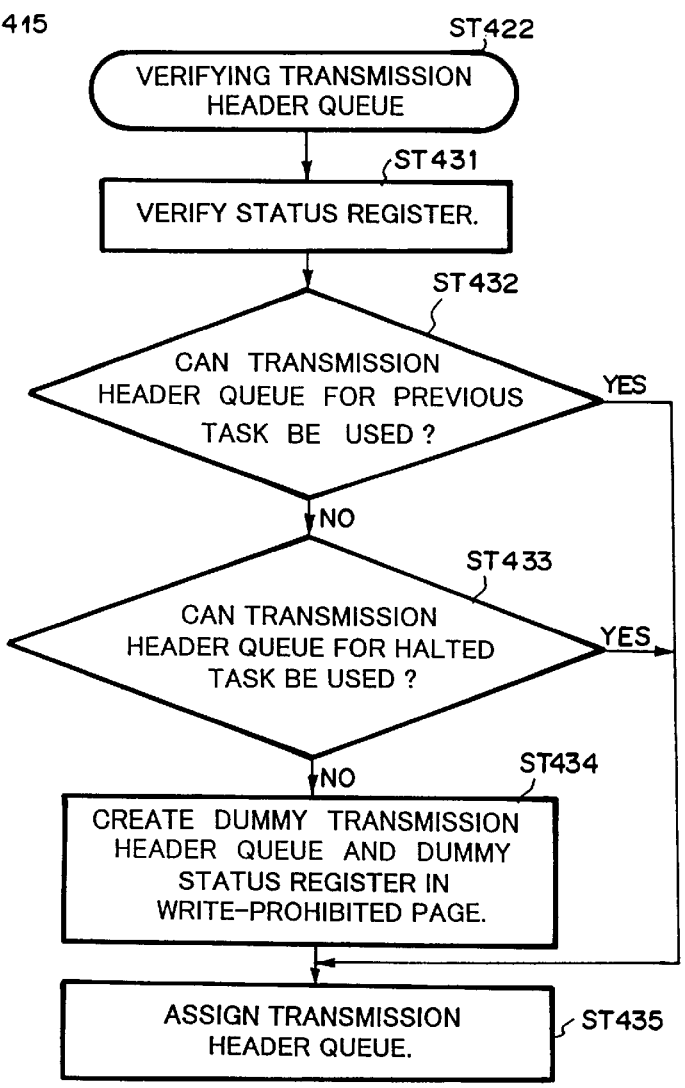

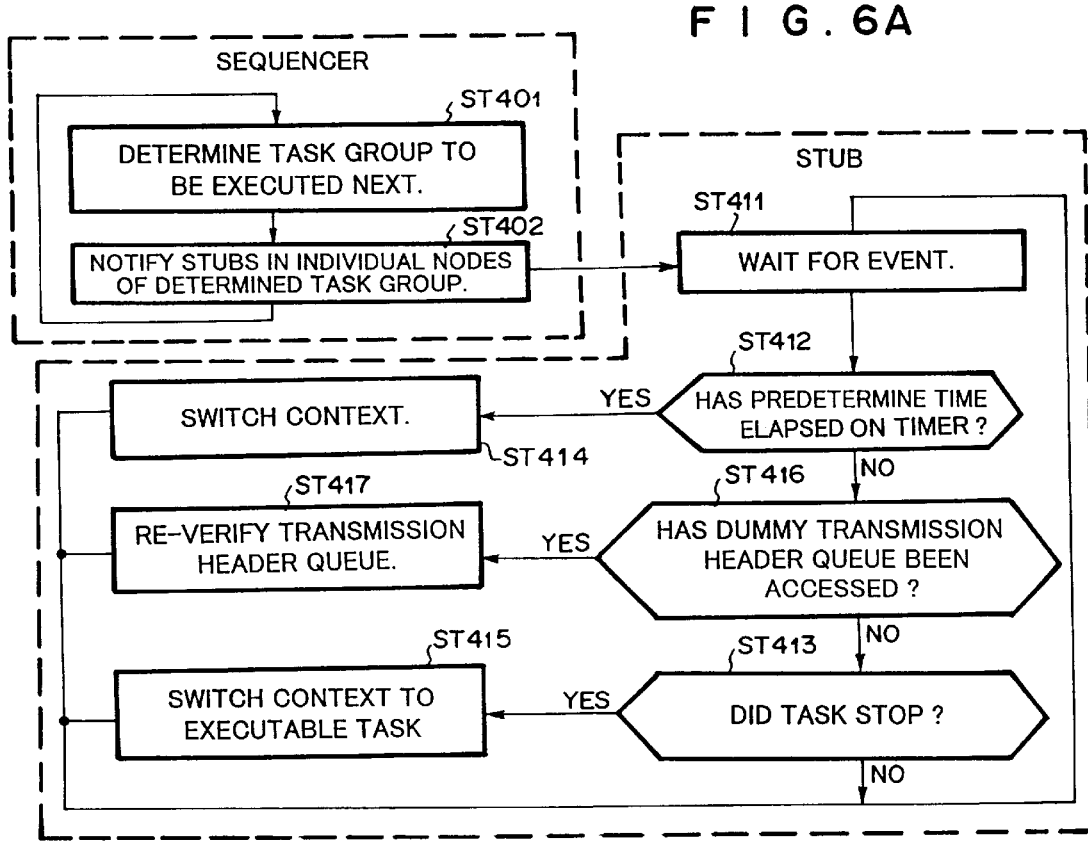
F I G. 6A

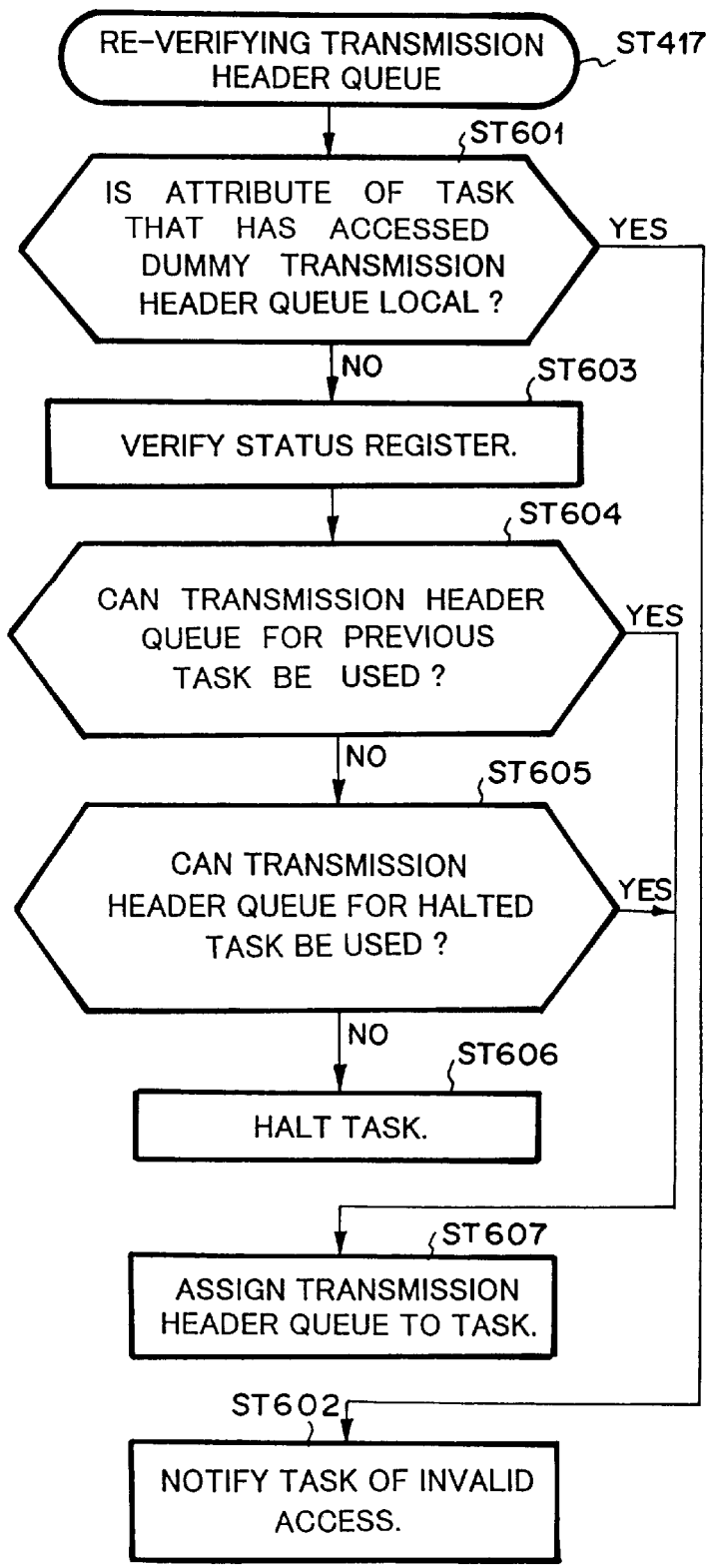

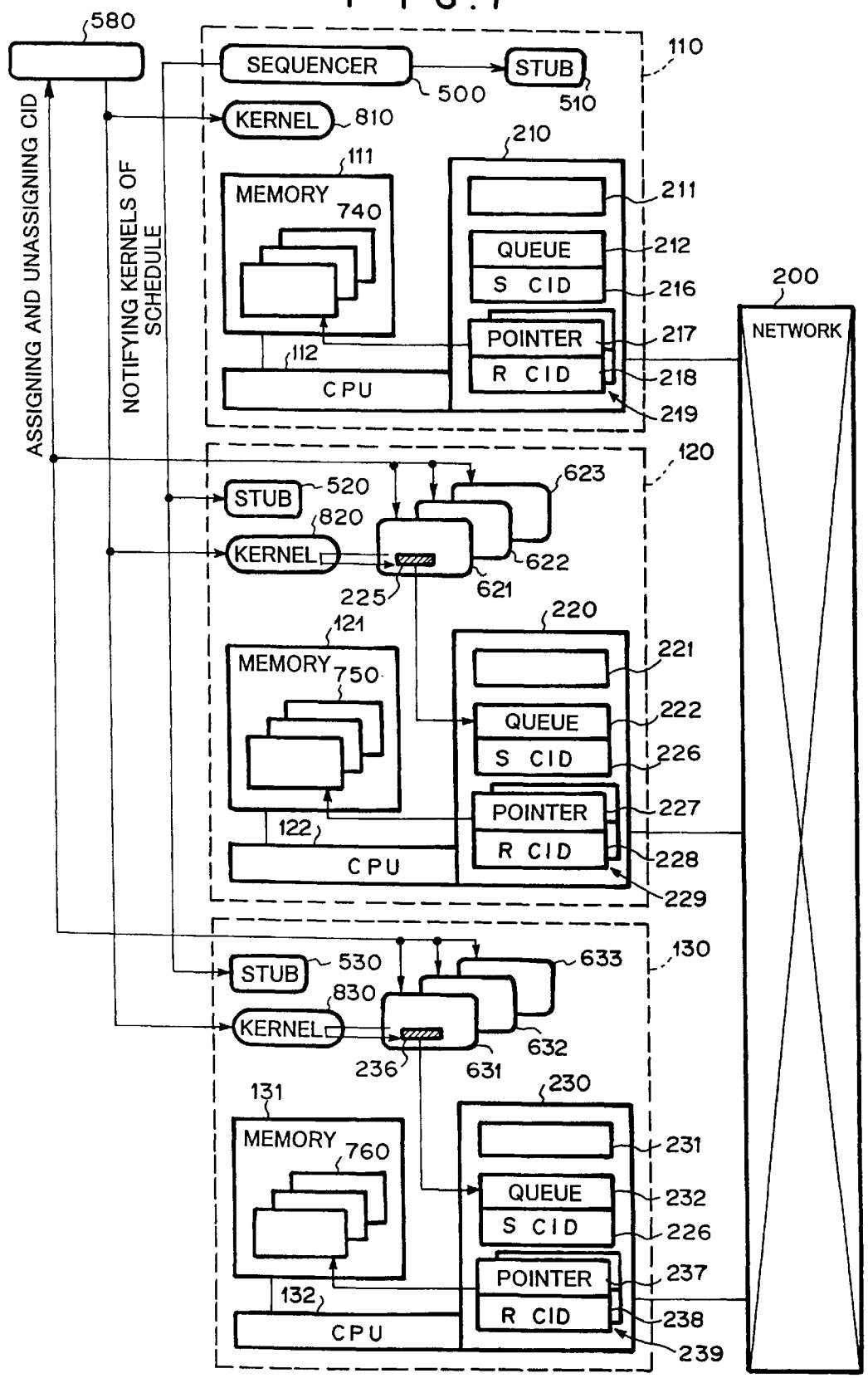

F I G. 9A
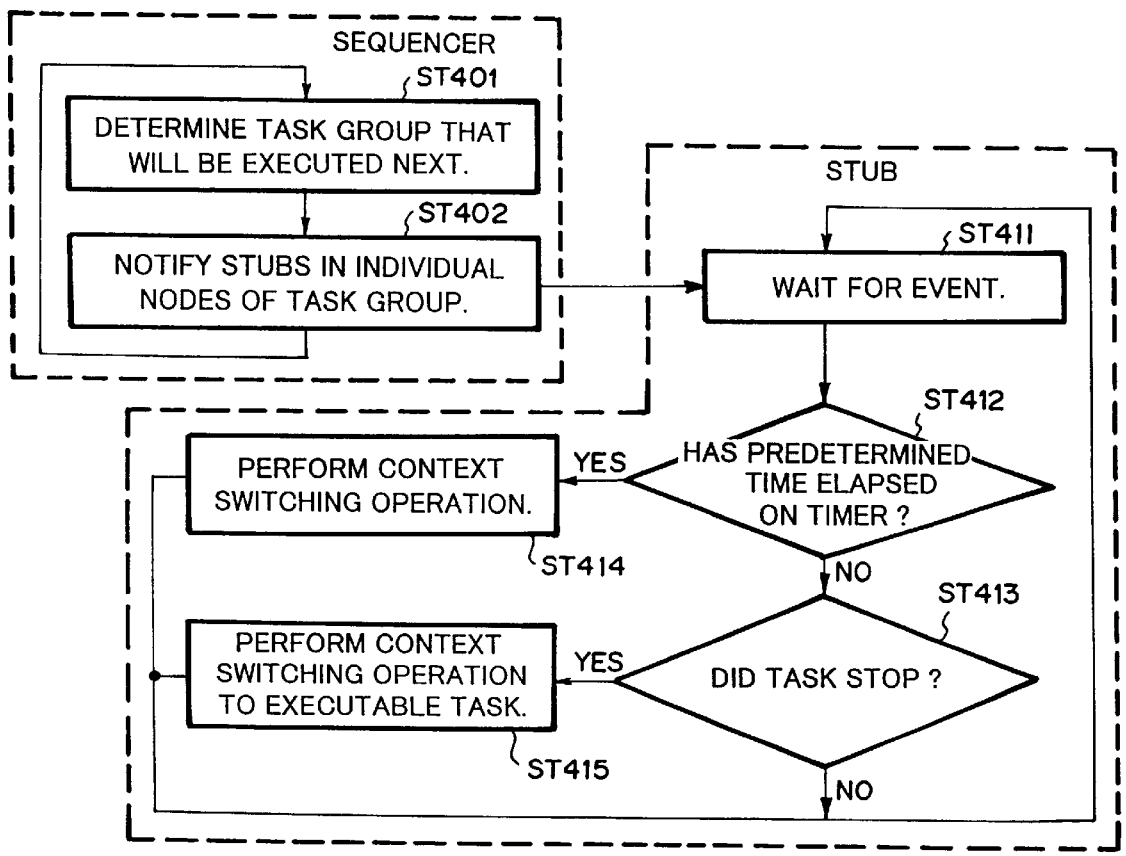
F I G. 9B
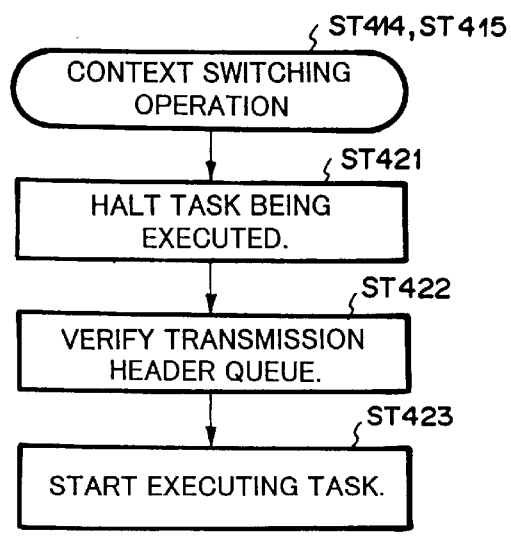

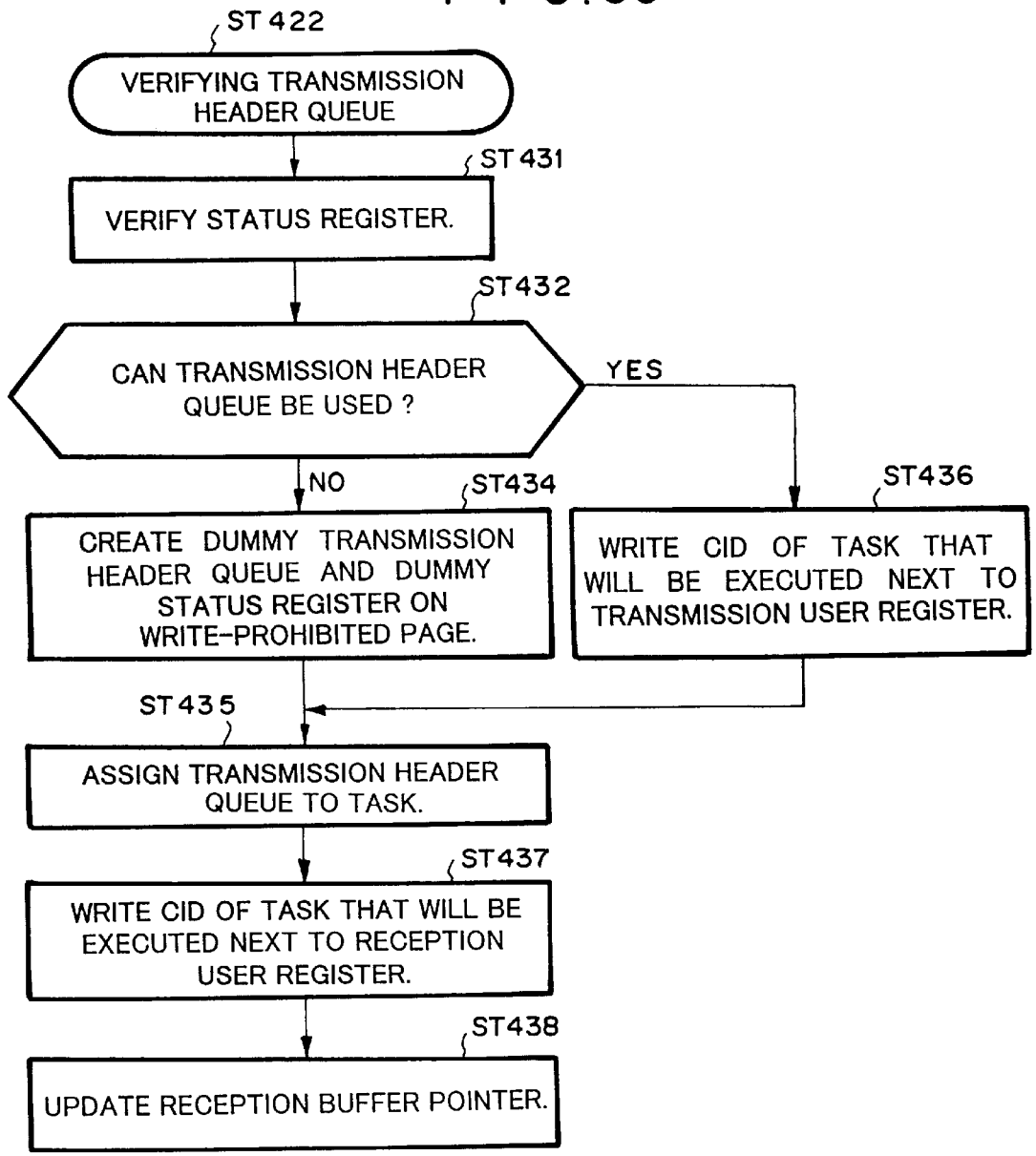

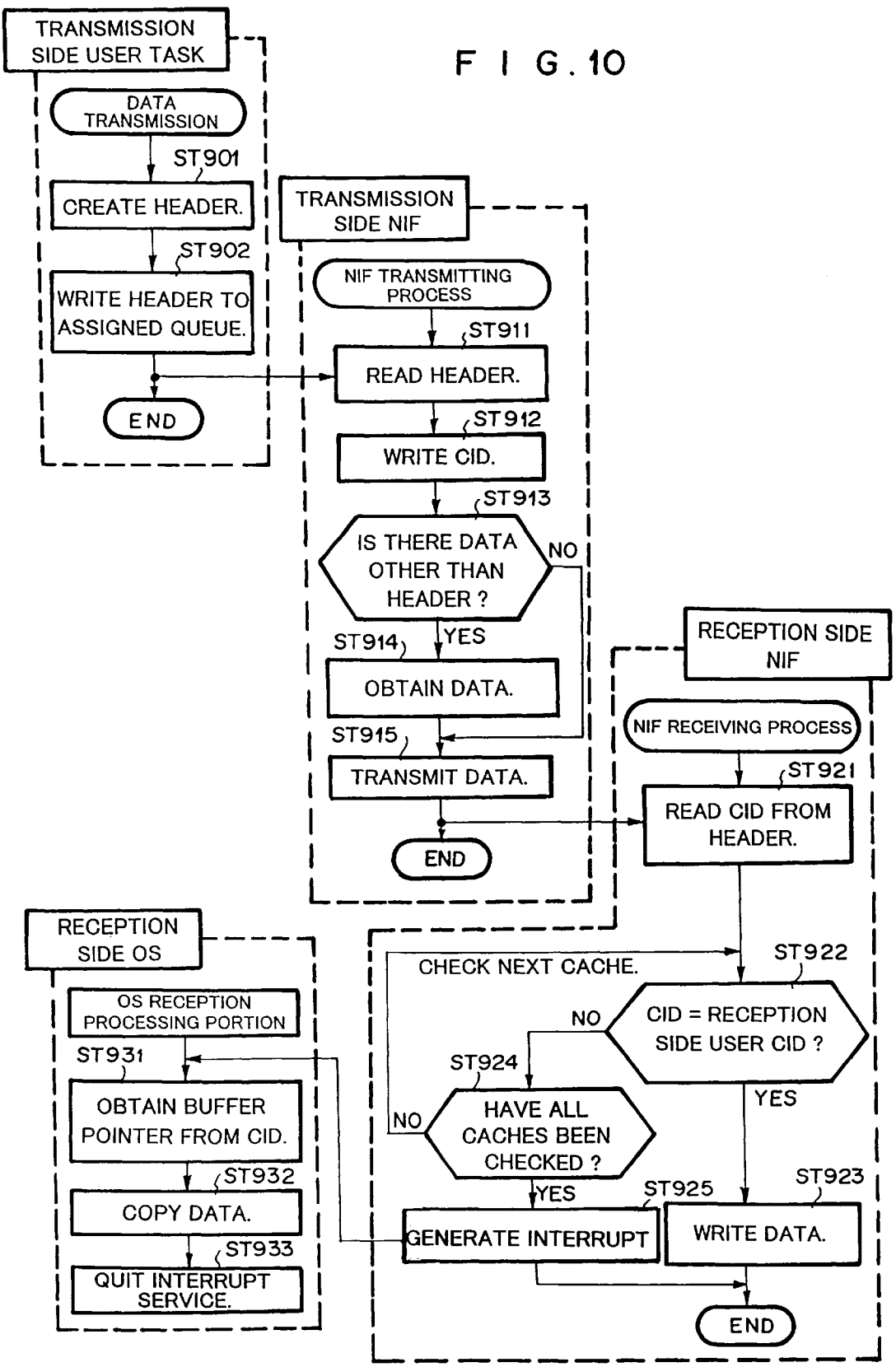
F I G. 10

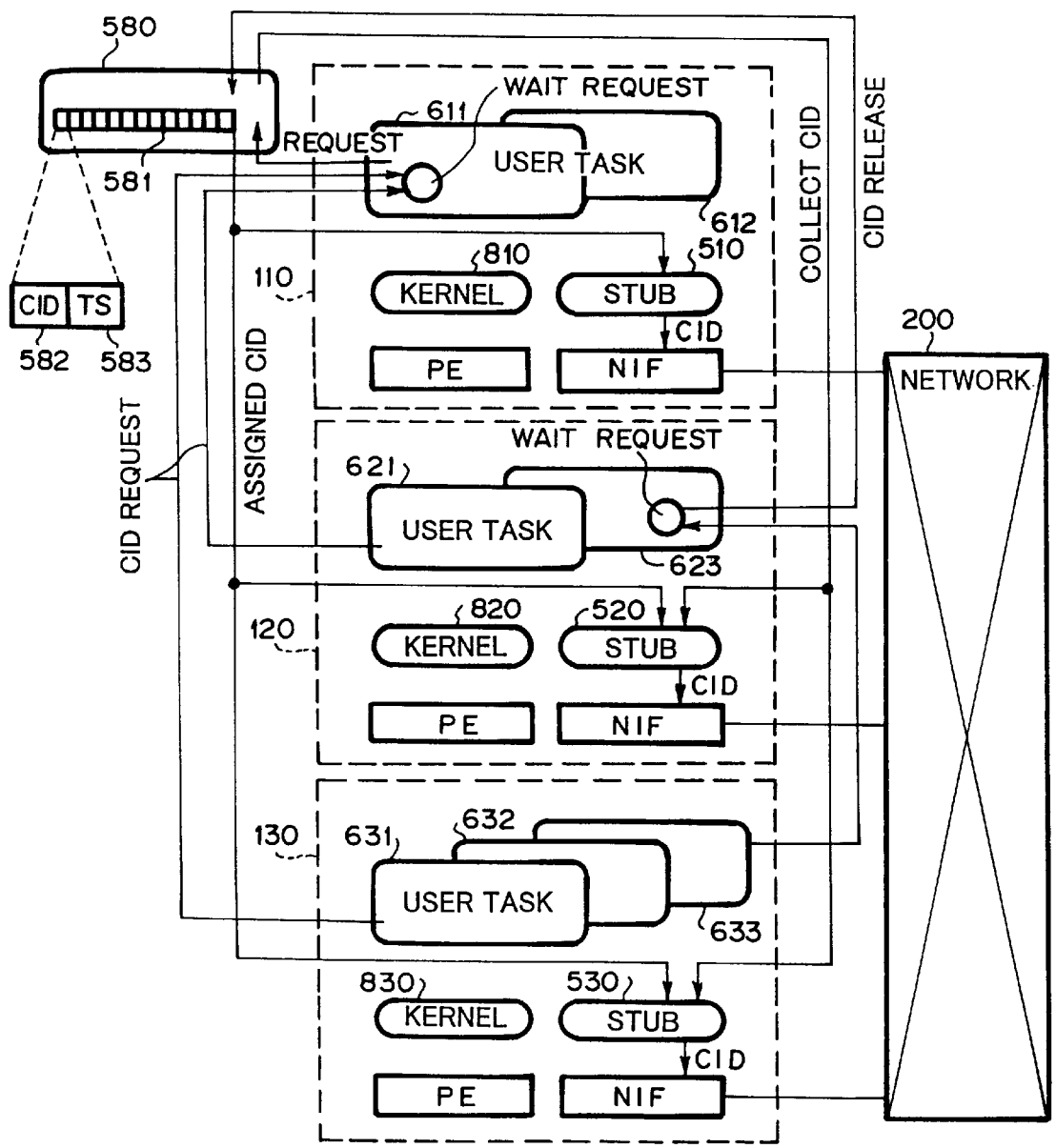
F I G. 11

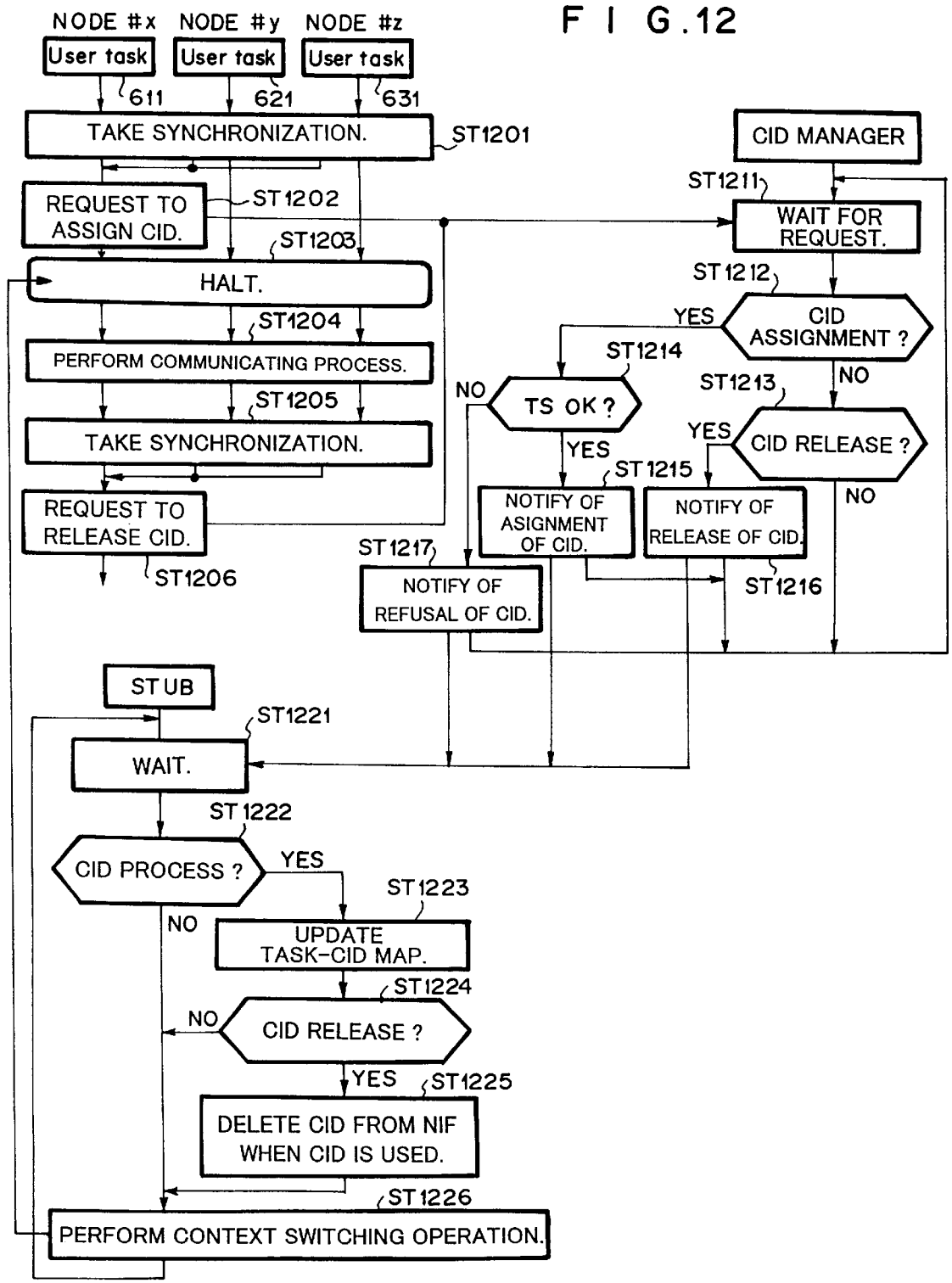
F I G. 12

METHOD AND COMPUTER PROGRAM PRODUCT FOR CONTROLLING DISTRIBUTED-MEMORY MULTIPROCESSOR SYSTEM

BACKGROUND OF THE INVENTION

1. Field of the Invention

The present invention relates to a distributed-memory multiprocessor system in which a plurality of nodes are mutually connected by a network and in particular, to a method for controlling an inter-node communication and a task scheduling operation on the distributed-memory multiprocessor system.

2. Description of the Prior Art

In order to effectively execute parallel-distributed programs of which each composed of a plurality of tasks on a multiprocessor system composed of a plurality of nodes, it is important to schedule a plurality of tasks that belong to the same application at the same time. As an example of such a scheduling method, the gang scheduling method is known.

However, the gang scheduling method was designed for a memory-shared multiprocessor system. Thus, in a distributed-memory multiprocessor system in which sharing information among processors costs a lot of time, the communication cost for sharing information should be decreased so as to reduce the overhead of the scheduling operation.

On the other hand, in order to enhance the performance of an inter-node communication for user tasks, there has been used an inter-node communicating system that operates in the user level and therefore that does not require a system call of an OS (Operating System). Such user-level communicating method and the gang scheduling method may be used in combination.

However, a user-level communication takes place in the level which does not concern OS. In addition, in a conventional user-level communication, each node has a single reception buffer. Thus, when one task is switched to another task (that is to say, a context switching operation is performed), in order to assure that communication data does not exist on the network and on the reception buffer, after one user task is stopped, it is necessary to confirm that no packet exists on the network and to save the reception buffer. Thus, such operations result in a large overhead.

Consequently, the context switching operation for user tasks in the gang scheduling method takes a long time. In order to suppress the influence of the lone time necessary for the context switching operation, the intervals of the context switching operation may be prolonged. However, in this case, the response characteristic of an interactive process with the user becomes deteriorative.

Thus, it takes a long time to perform the context switching operation in the distributed-memory multiprocessor system when the context switching operation employs the user-level communication. Consequently, the response characteristic and throughput of the system become deteriorative.

SUMMARY OF THE INVENTION

Therefore, an object of the present invention is to provide a user-level communication method and a scheduling method based thereon which allow the context switching operation for user tasks on a distributed-memory multiprocessor system to be performed in a short time.

According to the present invention, there is provided a method for controlling a distributed-memory multiprocessor system having a plurality of nodes mutually connected by a network, each of the nodes having a CPU and a memory, and a plurality of user tasks which belong to the same application and are executed in different nodes, which method comprises the steps of: (a) assigning a transmission resource of a network interface in the node to a user task that will be executed next and starting the execution of the user task when a context switching operation is performed; (b) reading data written by the user task from the transmission resource, adding to the data a communication identifier that is assigned to an application to which the user task belongs and that identifies a data reception area, and transmitting the resultant data to a reception side node through the network, in the network interface of each transmission side node; and (c) selecting a data reception area for storing data received from another node from a plurality of data receiving areas on the basis of the communication identifier added to the received data and storing the received data to the selected data reception area, in the network interface of each reception side node.

Each node has a plurality of data receiving areas that store received data. Received data is stored in different receiving areas depending on the communication identifier added to the received data. Thus, even if data remains on the network or in the data receiving areas, when the received data have communication identifiers different from one another, the data does not content in the data reception areas. Thus, when the context switching operation is performed (that is to say, when a user task that belong to an application in each node is suspended and another user task that belongs to another application is executed), regardless of whether or not transmission data of the former user task remains on the network or in the reception buffers, as long as a transmission resource can be assured, the context switching operation can be securely performed. Consequently, the overhead of the context switching operation can be alleviated.

The step (a) may comprises the step of (d) assigning a dummy transmission resource to the user task that will be executed next so that the user task can be executed when the network interface does not have a transmission resource that can be assigned to the user task in the context switching operation. Although a dummy transmission resource cannot be used for a real transmitting operation, a user task that has been started can be continuously executed until the transmitting operation is performed. Thus, user tasks whose total number exceeds the number of transmission resources can be executed at a time. Thus, the throughput of the system is improved in comparison with the conventional structure in which a user task is not executed if a transmission resource is not assigned thereto.

The step (d) is followed by the step of: (e) re-determining whether or not the network interface has a transmission resource that can be assigned to the user task when the user task accesses the dummy transmission resource, assigning the transmission resource instead of the dummy transmission resource to the user task when the network interface has the transmission resource that can be assigned to the user task, and continuously executing the user task. Thus, even if a dummy transmission resource is assigned to a user task, since a normal (non-dummy) transmission resource is dynamically assigned thereto, the user task can perform the transmitting operation. Consequently, the throughput of the system can be improved.

In addition, according to the present invention, each user task has one of three attributes that are represented by the terms of Strict (executed with strict simultaneity), GoAhead (executed alone when possible), and Local (no communication through a network interface (hereinafter referred to as NIF)). The attribute Strict represents that a relevant task must be executed strictly together with other tasks which belongs to the same application. The attribute GoAhead represents that if a relevant node becomes free due to any reason, a relevant task can be executed regardless of the status of other tasks which belongs to the same application. The attribute Local represents that a relevant task does not communicate through the NIF. For example, when the attribute of the user task is Local that represents that the user task does not communicate using the network interface, a dummy transmission resource is assigned to the user task that will be executed next. Thereafter, the user task is executed. Thus, since the verification of available transmission resources can be omitted, the process can be effectively performed. In addition, in the case that a user task that has been assigned a dummy transmission resource accesses it, when the at tribute of the user task is not Local, but strict or GoAhead, if there is a real transmission resource, it is re-assigned to the user task. If there is no real transmission resource, the execution of the user task is suspended.

The data reception area is a page in a virtual address space and a page table stores the address of the page as a data reception area; and the step (c) is performed by retrieving a page as a data receiving area for storing received data from the page table using the communication identifier added to the received data as a key, and selecting the data reception area, in the network interface of the each reception side node. Thus, data can be transmitted to virtual address spaces corresponding to communication identifiers.

The step (a) may comprises the step of: (f) storing the relation between the communication identifier for the user task that will be executed next and a pointer that points to the data reception area for the user task to a cache of the local network interface on the reception side node, and the step (c) may comprises the step of (g) retrieving the data reception area for storing the received data from the cache using the communication identifier added to the received data as a key, and selecting the data reception area to which the received data is written. Thus, data can be transmitted to data reception areas corresponding to communication identifiers. In this case, when there is not a cache having the communication identifier identical with the communication identifier of the received data, the network interface generates interrupt which causes the OS to store the received data.

The method further comprises the step of: (h) causing a CID manager for managing the communication identifiers to assign a communication identifier to an application before the application performs a communicating process and; (i) causing the CID manager to collect the assigned communication identifier from the application after completion of the communicating process so that the collected communication identifier can be reused. Thus, a limited number of communication identifiers can be effectively used.

The system has a scheduler which has a sequencer and stubs. The sequencer manages mapping of the applications and the user tasks that belong thereto and determines a schedule for a group of tasks executed across the nodes. Each of the stubs is disposed in each of the nodes. Each of the stubs performs the context switching operation for the tasks in each of the node corresponding to the command received from the sequencer. The sequencer sends the schedule to the stubs asynchronously with the context switching operation. Thus, the communication cost for the sequencer is concealed. Consequently, the overhead of the scheduling operation can be alleviated.

These and other objects, features and advantages of the present invention will become more apparent in light of the following detailed description of the preferred mode embodiments thereof, as illustrated in the accompanying drawings.

BRIEF DESCRIPTION OF DRAWINGS

FIGS. 4A, 4B, and 4C are flow charts showing the first example of the scheduling operation on the distributed-memory multiprocessor system shown in FIG. 1;

FIGS. 6A, 6B, 6C, and 6D are flow charts showing the second example of the scheduling operation on the distributed-memory multiprocessor system shown in FIG. 1;

FIG. 7 is a block diagram showing of the structure of a second example of the distributed-memory multiprocessor system according to the present invention;

FIGS. 9A, 9B, and 9C are flow charts showing an example of the scheduling operation on the distributed-memory multiprocessor system shown in FIG. 7;

FIG. 10 is a flow chart showing an example of the inter-node communication for transmitting and receiving data between a task of a transmission side node and a task of a reception side task in the distributed-memory multiprocessor system shown in FIG. 7;

FIG. 11 is a schematic diagram for explaining a first example of a CID managing method according to the present invention;

FIG. 12 is a flow chart showing the first example of the CID managing method according to the present invention;

DESCRIPTION OF PREFERRED EMBODIMENTS

Next, with reference to the accompanying drawings, an embodiment of the present invention will be explained.

Figure 1:
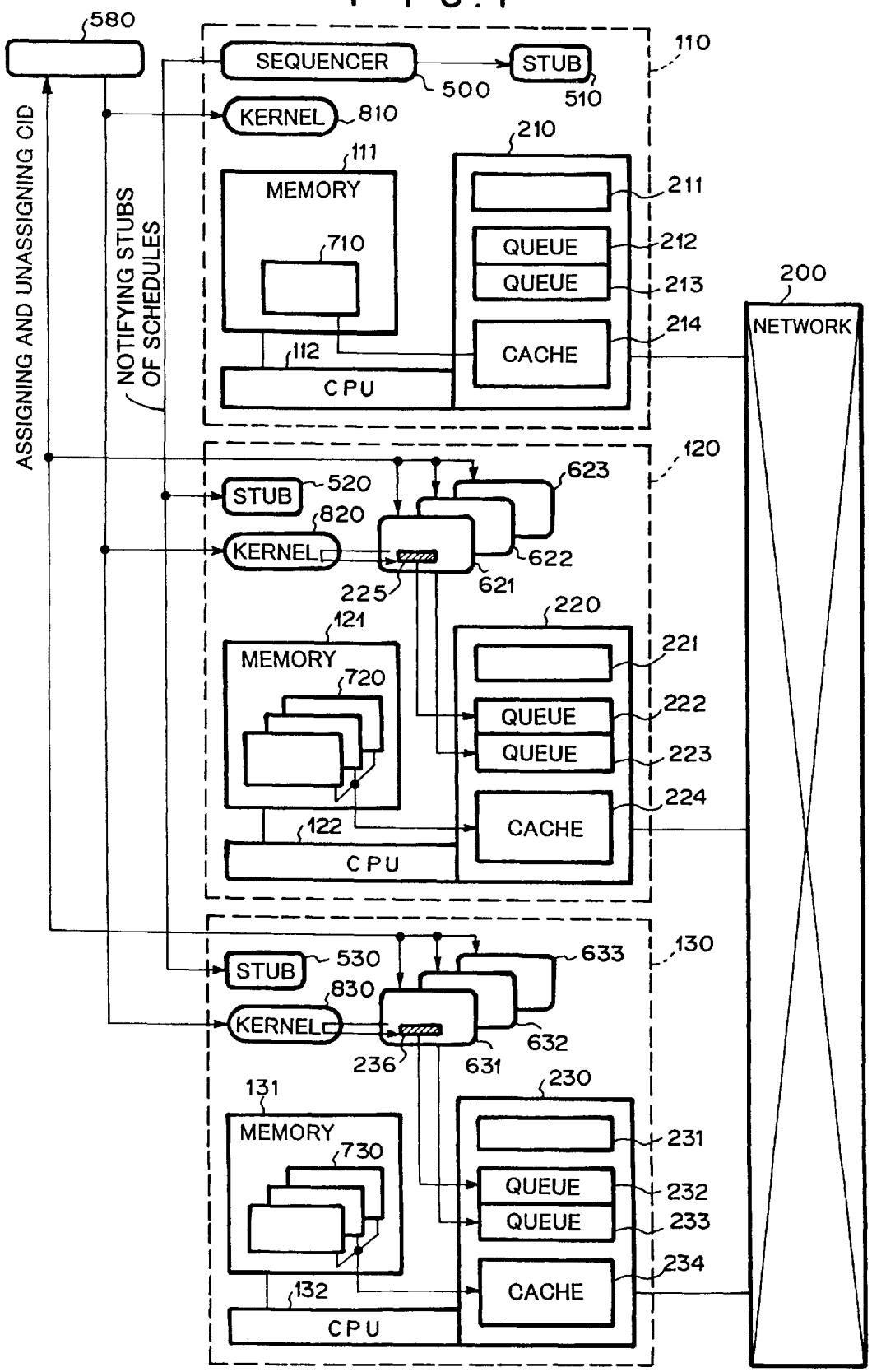
FIG. 1 is a block diagram showing the structure of a first example of the distributed-memory multiprocessor system according to the present invention.

FIG. 1 shows a computer system having a plurality of nodes 110, 120, and 130 mutually connected by a network 200.

The node 110 comprises processing element (CPU) 112, network interface (hereinafter referred to as NIF) 210, memory 111, kernel 810, sequencer 500, and stub 510. Node 120 comprises processing element 122, NIF 220, memory 121, kernel 820, and stub 520. Node 130 comprises processing element 132, NIF 230, memory 131, kernel 830, and stub 530. In this example, sequencer 500 is disposed in node 110. However, sequencer 500 may be disposed in another node.

Node 120 has user tasks 621 to 623. Node 130 has user tasks 631 to 633. User task 621 and user task 631 belong to the same application. User task 622 and user task 632 belong to the same application. User task 623 and user task 633 belong to the same application. In addition, node 110 also may have a user task.

Nodes 110, 120, and 130 are connected to network 200 through the NIFs 210, 220, and 230, respectively.

NIF 210 has two transmission header queues 212 and 213, status register 211, and page table cache 214. Status register 211 manages various statuses such as the status indicating whether or not transmission header queues 212 and 213 are vacant. Transmission header queues 212 and 213 and status register 211 are transmission resources. Likewise, NIF 220 has two transmission header queues 222 and 223, status register 221, and page table cache 224. NIF 230 has two transmission header queues 232 and 233, status register 231, and page table cache 234.

Memories 111, 121, and 131 have page tables 710, 720, and 730, respectively. NIFs 210, 220, and 230 uses page tables 710, 720, and 730 when they access virtual pages that are data transmission/reception areas of individual tasks, respectively. The page tables 710, 720, and 730 store physical addresses (page numbers) of individual virtual pages which correspond to CID. CID is a communication identifier used in inter-node communication. The tasks of an application to which CID is assigned use the virtual pages as data transmission/reception area. Kernels 810, 820, and 830 of the OS create page tables 710, 720, and 730 in memories 111, 121, and 131 and manage them, respectively. Page table caches 214, 224, and 234 in NIFs 210, 220, and 230 are caches of page tables 710, 720, and 730, respectively. Each cache stores a page number of one page for each CID. In addition, each cache has a pointer to a portion for the relevant CID of page table 710, 720, or 730 for obtaining other page numbers.

A scheduler provides the computer system with a time sharing environment. The scheduler comprises sequencer 500 and stubs 510, 520, and 530. Sequencer 500 manages the entire system. Stabs 510, 520, and 530 schedule tasks of nodes corresponding to a command received from sequencer 500.

When an application gets started, a CID, which is a communication identifier used for an inter-node communication, is assigned to the application by CID manager 580 of the system. In addition, the CID is sent to kernels 810, 820, and 830 of the individual nodes so as to manage page tables 710, 720, and 730, respectively. CID manager 580 may be disposed at any node that composes the system. Alternatively, CID manager 580 may be disposed outside the nodes. Kernels 810, 820, and 830 manage pages as data transmission/reception areas used for tasks that belong to individual applications. Kernels 810, 820, and 830 update page tables 710, 720, and 730 in their latest state corresponding to the received CID, respectively.

Tasks that belong to the same application have the same CID. In the inter-node communication between the tasks, each NIF uses CIDs as communication identifiers. In other words, network 200 and NIFs 210, 220, and 230 manage and identify communications by using CIDs.

After an application has been completed, CID manager 580 collects a CID that has been assigned thereto so that the collected CID can be reused. Each kernel updates the respective page table. CID manager 580 does not assign a CID to an application having an attribute Local that represents that an inter-node communication is not performed. The attribute Local is the attribute assigned to a task that does not perform an inter-node communication. CID manager 580 collects a CID from an application of which attribute has changed to Local by giving instructions to schedulers so that the collected CID can be reused.

Figure 2:
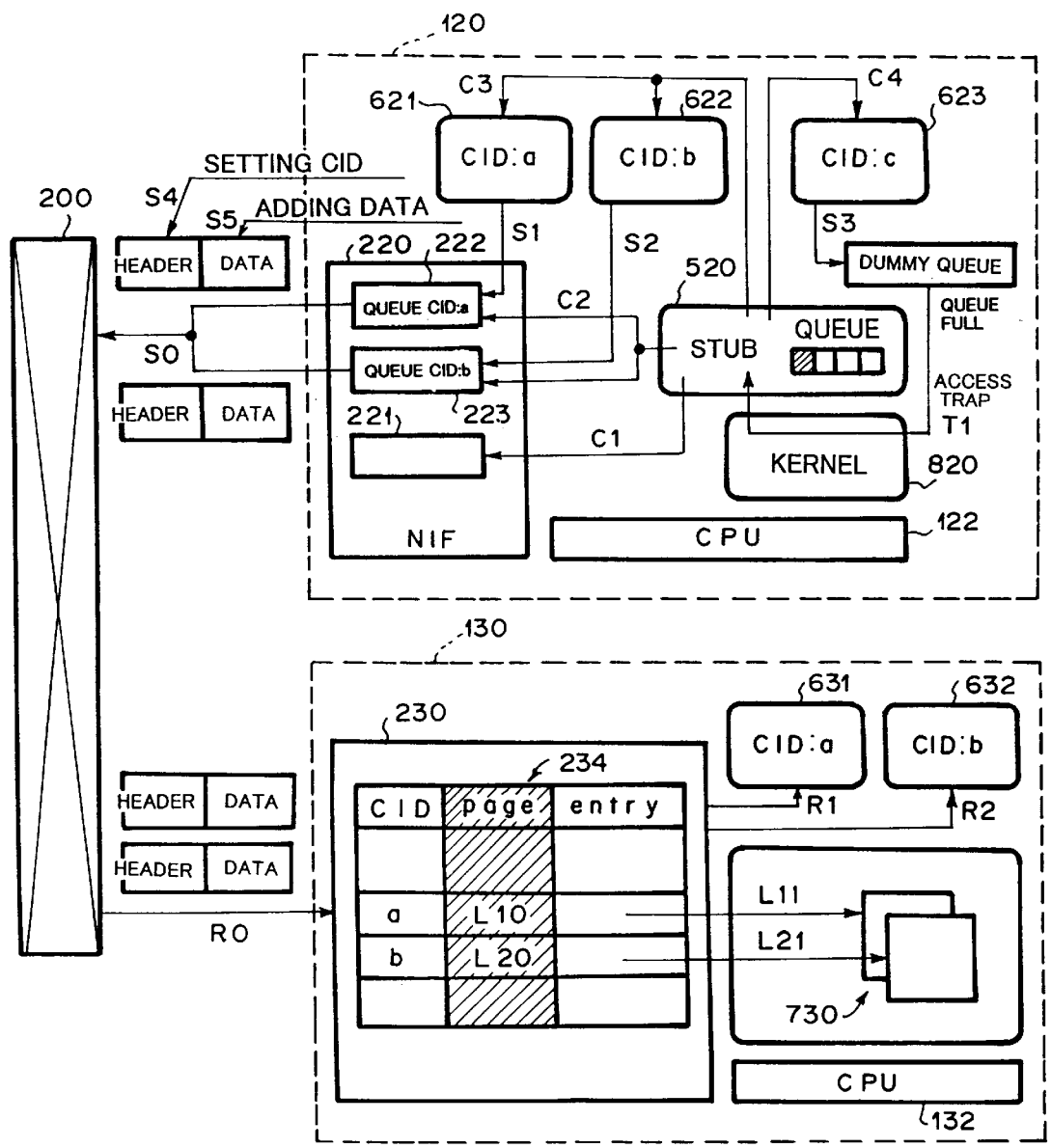
FIG. 2 is a schematic diagram for explaining a first example of the operation of an inter-node communication and a scheduling operation on the distributed-memory multiprocessor system shown in FIG. 1.

FIG. 2 is a schematic diagram for explaining an inter-node communication and a scheduling operation on the distributed-memory multiprocessor system shown in FIG. 1. Referring to FIG. 2, the inter-node communication and the scheduling operation performed between nodes 120 and 130 shown in FIG. 1 are explained. In this example, it is assumed that node 120 is a transmission side node and node 130 is a reception side node. Thus, in FIG. 2, only structural elements of the transmitting operation and the receiving operation of these nodes are illustrated. The flow of the operations is denoted by arrows accompanying characters such as S1. In FIG. 2, structural elements of a part related to the scheduling operation are also illustrated.

Figure 3:
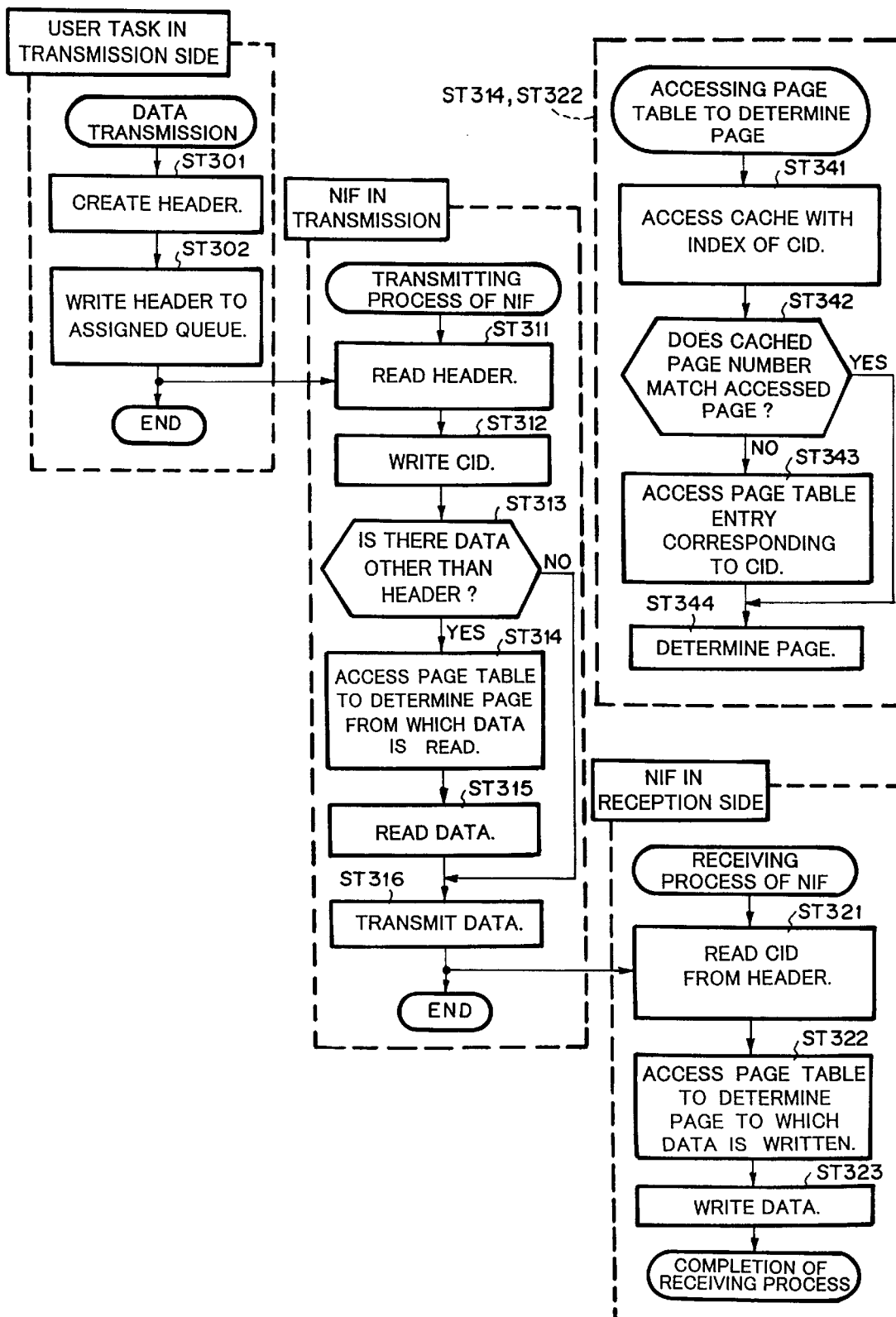
FIG. 3 is a flow chart showing the first example of the inter-node communication for transmitting and receiving data between a task in a transmission side node and a task in a reception side node in the distributed-memory multiprocessor system shown in FIG. 1.

FIG. 3 is a flow chart showing a process of a transmission side user task, a process of a transmission side NIF, and a process of a reception side NIF in an inter-node communication for transmitting and receiving data between a task in the transmission side node and a task in the reception side node. In addition, FIG. 3 shows the flow of a page (read page and write page) determining process by accessing a page table.

Next, with reference to FIGS. 1, 2, and 3, a first example of the operation, that is the inter-node communication, on the distributed-memory multiprocessor system shown in FIG. 1 will be explained. In the following explanation, the inter-node communication performed between node 120 and node 130 will be explained. However, such a communication can be performed between any nodes.

When tasks 621, 622, 623, 631, 632, and 633 of nodes 120 and 130 are scheduled by the schedulers (stubs 520 and 530), transmission header queues 222 and 223 of NIF 220 and transmission header queues 232 and 233 of the NIF 230 are assigned to tasks 621, 622, 623, 631, 632 and 633. In FIG. 2, transmission header queues 222 and 223 are assigned to tasks 621 and 622, respectively (C3). Since NIF 220 has only two transmission header queues 222 and 223, if the two header queues 222 and 223 are assigned to tasks 621 and 622, there is no transmission header queue to be assigned to task 623. In this case, a dummy transmission header queue is assigned to task 623. Details of this assignment will be described in the explanation of scheduling operation.

The schedulers (stubs 520 and 530) set CIDs of the tasks owing transmission header queues 222, 223, 232 and 233 to transmission header queues 222, 223, 232, and 233. For example, assuming the CIDs which have been assigned to applications to which tasks 621 and 622 belong are a and b, respectively, the CIDs assigned to transmission header queues 222 and 223 to which tasks 621 and 622 are allotted are a and b, respectively, in node 120 as denoted by C2 shown in FIG. 2.

Task 621 in node 120 communicates with task 631 in node 130. In addition, task 622 in node 120 communicates with task 632 in node 130. Before tasks 621, 622, 631, and 632 start communication, they request kernels 820 and 830 to map the registers (transmission header queues and the like) of NIFs 220 and 230 to their respective virtual address spaces (shown in FIG. 1). Thereafter, each task directly operates NIF 220 or 230 by accessing mapped register 225 or 235 without an intervention of the OS.

Now, it is assumed that task 621 in node 120 transmits data to task 631 in node 130 and that task 622 in node 120 transmits data to task 632 in the node 130. When transmission side tasks 621 and 622 transmit data, they create respective headers. Each header has a destination node, a destination address, data, and so forth (ST301 shown in FIG. 3). Tasks 621 and 622 write the headers to transmission header queues 222 and 223 through mapped register 225 (S1 and S2 shown in FIG. 2 and ST302 shown in FIG. 3).

When the headers have been written to transmission header queues 222 and 223, transmission side NIF 220 reads the headers (ST311 shown in FIG. 3) and sets CIDs of the tasks owing transmission header queues 223 and 223, which is set to transmission header queues 222 and 223 (CID for task 621 is a and CID for task 622 is b in the example shown in FIG. 2) to the headers (ST312 shown in FIG. 3) and transmits the resultant headers as packets to node 130 through network 200 (ST316 shown in FIG. 3). Since the NIF automatically assigns CIDs to the headers in this way, a user task cannot change the CID. Thus, the system can be securely operated.

Besides the headers, data stored in the memories (pages) of tasks 621 and 622 may be transmitted. In this case, tasks 621 and 622 write addresses of memories (pages) thereof to headers to be written to transmission header queues 222 and 223. When NIF 220 detects such addresses, it accesses the page table in order to determine pages in which transmission data of tasks 621 and 622 are stored (ST314 shown in FIG. 3).

When NIF 220 determines pages by accessing the page table, NIF 220 accesses page table cache 224 using the CIDs assigned to tasks 621 and 622 as indices (ST341 shown in FIG. 3). Cache 224 stores the page number of a single page for each of the CIDs assigned to tasks 621 and 622. The page number stored in cache 224 and the address of the page of the transmission data designated by the tasks 621 or 622 are compared. When the cached page number is identical to the page to be accessed (that is to say, the page in which transmission data is recorded) (that is to say, the determined result at ST342 shown in FIG. 3 is Yes), the page specified by the page number is determined from which data is read (ST344 shown in FIG. 3). In contrast, when the page number that has been cached is not the page to be accessed (that is to say, the determined result at step S342 shown in FIG. 3 is No), NIF 220 accesses page table 720 in memory 121 using the CID as index (ST343 shown in FIG. 3) in order to determine the page number of the page from which data is read (ST344 shown in FIG. 3).

Next, data are read from the memories (pages) of user tasks 621 and 622 (ST315 shown in FIG. 3). The data are added to the headers and transmitted to node 130 (S5 and S0 shown in FIG. 2 and ST316 shown in FIG. 3).

When NIF 230 of reception side node 130 has received the data (packets) (R0 shown in FIG. 2), NIF 230 analyzes the headers and reads the CIDs (ST321 shown in FIG. 3), NIF 230 accesses page table 234 using the CIDs as indices in order to determine the memories (pages) of tasks 631 and 632 to which the received data are written (ST322 shown in FIG. 3).

In the process of determining the write page by accessing the page table, NIF 230 accesses page table cache 234 using the CIDs assigned to tasks 631 and 632 as indices first of all. As shown in FIG. 2, page table cache 234 stores the page number of a single page for each of tasks 631 and 632. Each page number stored in cache 234 is compared with a destination address obtained by analyzing each header. When the cached page number is identical with the page number of the page to which data will be written (that is to say, the determined result at step ST342 shown in FIG. 3 is Yes), the page specified by the cached page number is determined as the page to which data will be written (ST344 shown in FIG. 3). In contrast, when the cached page number is not identical with the page number of the page to which data will be written (that is to say, the determined result at step ST342 shown in FIG. 3 is No), page table 730 of memory 131 is accessed using the CID as index (L11 and L21 shown in FIG. 2 and ST343 shown in FIG. 3) in order to determine the page number of the page to which data will be written (ST344 shown in FIG. 3).

Next, the received data is directly written to the memories (pages) of user tasks 631 and 632 (that is to say, the relevant virtual memories of the reception side tasks) (R1 and R2 shown in FIG. 2 and ST323 shown in FIG. 3).

As explained above, according to this example, data can be transmitted to virtual address spaces which correspond to individual CIDs regardless of context of tasks that are executed. Thus, the context switching operation started by a schedulers may be safely performed by managing only header queues 212, 213, 222, 223, 232, and 233 in the transmission side NIFs. In other words, it is assured that the state of the network and the state of the reception side do not affect the context switching operation.

Figure 4A:
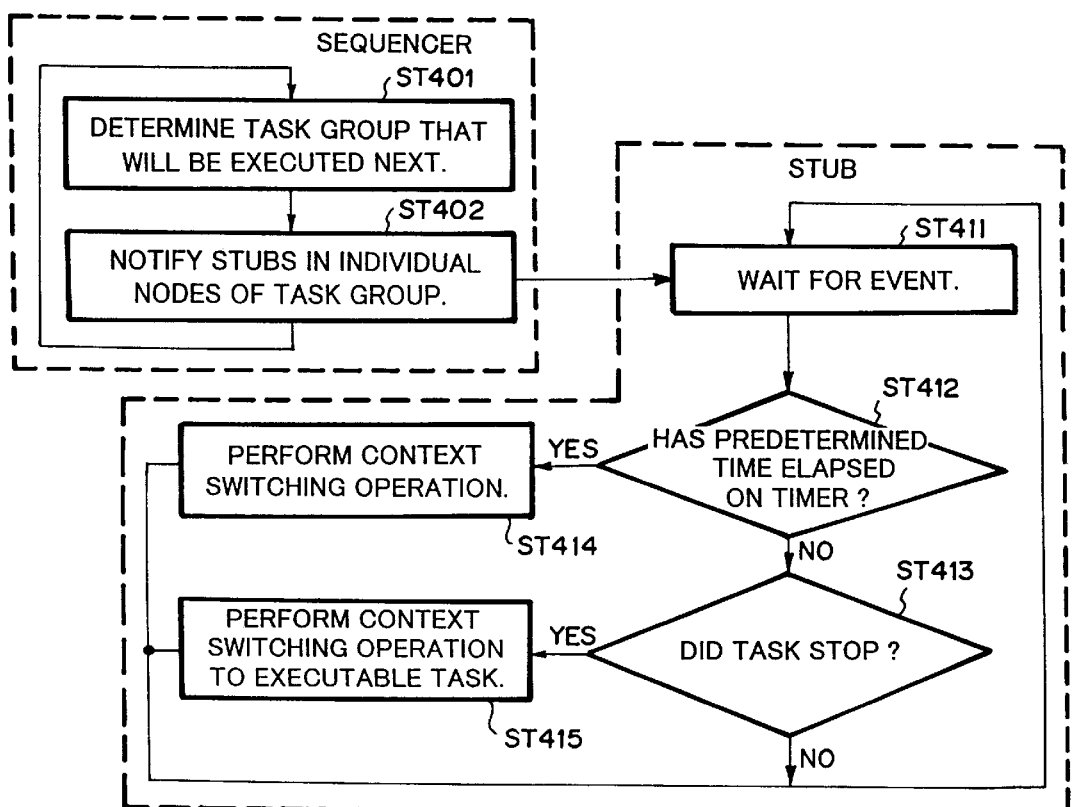

FIGS. 4A to 4C show an example of a process of sequencer 500 and processes of stubs 510, 520, and 530 in a scheduling operation. In addition, FIGS. 4A to 4C show the flow of a context switching operation in the process of stubs 510, 520, and 530 and the flow of a transmission header queue verifying operation performed in the context switching operation.

Next, with reference to FIGS. 1, 2, and 4A to 4C, an example of the scheduling operation of the distributed-memory multiprocessor system shown in FIG. 1 will be explained.

Sequencer 500 has system-scale mapping information of applications and tasks and determines a task group that will be executed next in the individual nodes (ST401 shown in FIG. 4A). Sequencer 500 notifies stubs 510, 520, and 530 of the individual nodes of tasks that are scheduled to be executed next (ST402 shown in FIG. 4A). This notification is performed at arbitrary time until the next context switching operation is performed. Because stubs 510, 520, and 530 are in sleep state when the context switching operation is not performed and notification of the schedule from sequencer 500 to stubs 510, 520, and 530 is performed while the context switching operation is not performed, the communication cost of the notification is concealed. Thus, the throughput of the entire system can be improved.

Stubs 510, 520, and 530 have respective local schedule managing queues in their nodes (stub 520 shown in FIG. 2). When the predetermined time has elapsed on a particular timer, corresponding to a command received from sequencer 500, stubs 510, 520, and 530 simultaneously perform the context switching operation (ST411, ST412, and ST413 shown in FIG. 4A). When a task stops execution, stubs 510, 520, or 530 also performs the context switching operation (ST411, ST413, and ST415 shown in FIG. 4A).

Because the scopes of operation and management of stubs 510, 520, and 530 are limited within the respective nodes, queries from stubs 510, 520 and 530 to sequencer 500 are not necessary. Therefore, communication between sequencer 500 and stubs 510, 520 and 530 may be limited to one-way communication from sequencer 500 to stubs 510, 520, and 530. Consequently, the communication cost can be reduced and thereby the throughput of the system can be improved.

When the context switching operation is performed, stubs 510, 520, and 530 suspend tasks being executed (ST421 shown in FIG. 4B). Next, in order to assign transmission header queues to tasks that will be executed next, stubs 510, 520, and 530 verify the transmission header queues of NIFs 210, 220, and 230, respectively (ST422 shown in FIG. 4B). Since it is assured that data on the network and the states of reception side nodes are not affected by the context switching operation, the context switching operation can be securely performed by only verifying the states of the transmission header queues on the transmission side.

In the verification of the transmission header queues, status registers 211, 221, and 231 of the NIFs 210, 220, and 230 are verified (C1 shown in FIG. 1 and ST431 shown in FIG. 4C) so as to get the states of the transmission header queues. A vacant transmission header queue among two transmission header queues of each node is assigned to a task that is scheduled to be executed next (C3 shown in FIG. 2 and ST432, ST433, and ST434 shown in FIG. 4C). At this point, stubs 510, 520, and 530 notify NIFs 210, 220, and 230 of CIDs of applications to which the tasks belong, which is the notification of the tasks owing the transmission header queues (C2 shown in FIG. 2). The CIDs are set to the transmission header queues as described in the explanation of inter-node communication.

If both of the two transmission header queues are used when the transmission header queue is verified (that is to say, the determined result at step ST433 shown in FIG. 4C is No), stubs 510, 520, and 530 create write-protected pages in their virtual address spaces, generate dummy transmission header queues and dummy status registers that cause the user tasks to determine that the queues are full on these pages (ST434 shown in FIG. 4C), and assign the dummy transmission header queues to the tasks that will be executed next (ST435 shown in FIG. 4C).

After the above-explained process is completed, the scheduled tasks are executed (ST423 shown in FIG. 4B).

The tasks to which normal (non-dummy) transmission header queues are assigned (for example, tasks 621 and 622 shown in FIG. 2) can perform inter-node communication in the manner described in the explanation of inter-node communication.

On the other hand, the task to which a dummy transmission header queue is assigned (for example, task 623 shown in FIG. 2) does not perform inter-node communication because the dummy status register causes the task to determine that the transmission header queue is full. However, this task can perform a process before the transmitting process. A task does not necessarily start data transmission immediately after the start of execution. Thus, as compared with the case that a task that is scheduled is not executed at all in the case that there is no free transmission header queue, the throughput of the system can be improved in the above operation. However, if a header is written to a dummy transmission header queue, the writing operation is trapped by the OS and a relevant stub is notified of the trap of the writing operation (T1 shown in FIG. 2).

Next, a second example of the operation, that is, a scheduling operation, on the distributed-memory multiprocessor system shown in FIG. 1 will be explained.

Unlike the first example, in the second example, a scheduler distinguishes tasks by three attributes Strict (executed with strict simultaneity), GoAhead (executed alone if possible), and Local (no communication through NIF). The scheduler performs processes corresponding to the attributes. In addition, the second example is different from the first example in the operation when there is no vacant transmission header queue.

The attribute Strict represents that a relevant task must be executed with strict simultaneity with other tasks that belong to the application to which the relevant task belongs. The attribute GoAhead represents that if a relevant node becomes free due to any reason, a relevant task can be executed alone regardless of the statuses of other tasks that belong to the application to which the relevant task belongs. The attribute Local represents that a relevant task does not communicate through the NIF.

Figure 5:
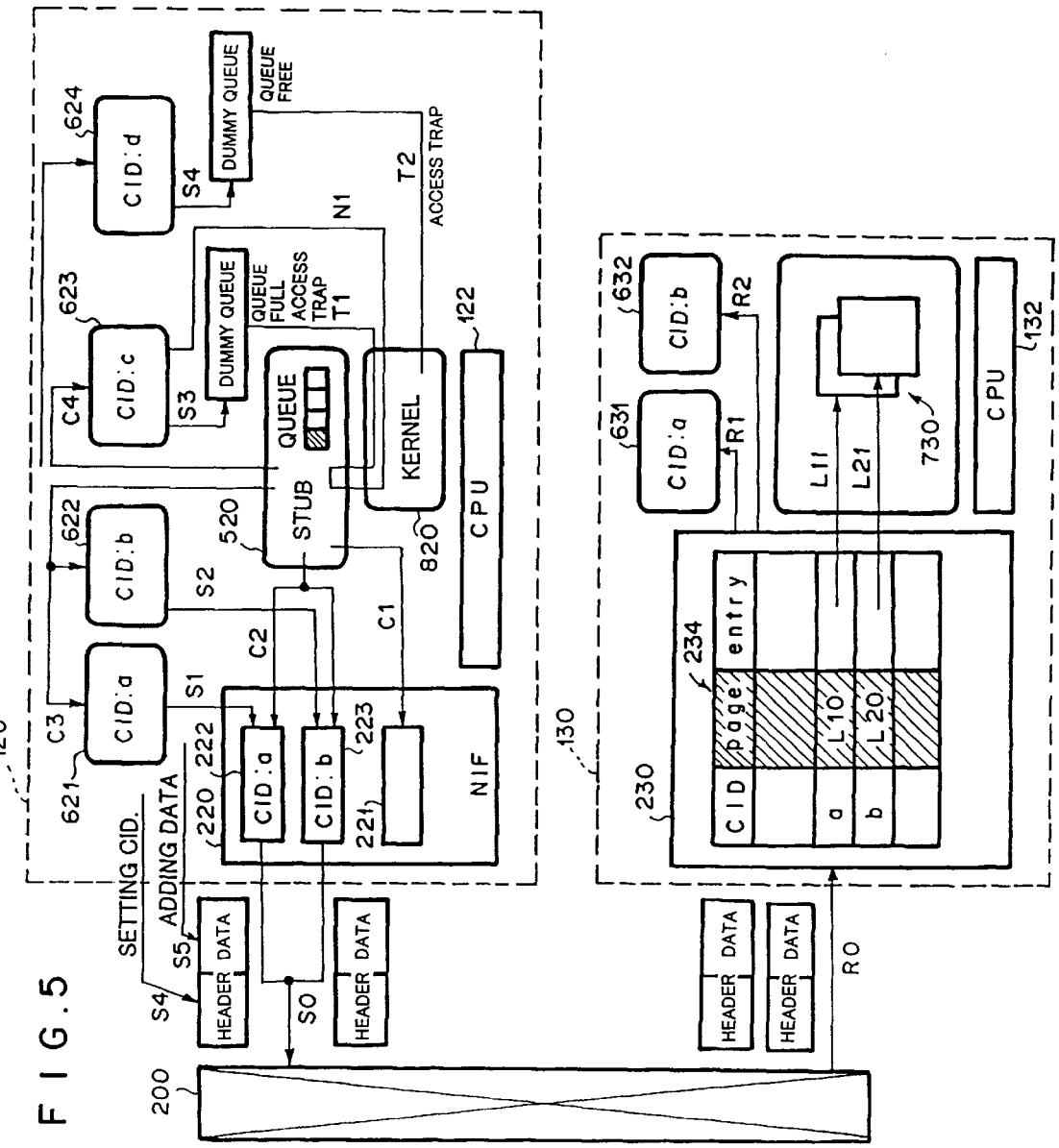
FIG. 5 is a schematic diagram for explaining a second example of the scheduling operation on the distributed-memory multiprocessor system shown in FIG. 1.

FIG. 5 is a schematic diagram for explaining the second example of the scheduling operation on the distributed-memory multiprocessor system shown in FIG. 1. In this example, it is assumed that node 120 is a transmission side node and node 130 is a reception side node. Thus, in FIG. 5, only structural elements of the transmitting operation and the receiving operation of these nodes are illustrated. The flow of the operations is denoted by arrows accompanying characters such as S1. In FIG. 5, structural elements of a part related to the scheduling operation are also illustrated.

FIGS. 6A to 6D show the flows of the second example of the scheduling operation. In the scheduling operation shown in FIGS. 6A to 6D, steps ST416, ST417, ST424 to ST428, and ST601 to ST607 are added to the scheduling operation shown in FIG. 2.

Next, with reference to FIGS. 1, 5, and 6A to 6D, the second example of the scheduling operation will be explained.

Sequencer 500 determines a task group that will be executed next for the individual nodes corresponding to system-scale mapping information of applications and tasks (ST401 shown in FIG. 6A) and notifies stubs 510, 520, and 530 of the determined task group (ST402 shown in FIG. 6A). Stubs 510, 520, and 530 have respective local schedule management queues (shown in stub 520 in FIG. 5). When the predetermine time has elapsed on a particular timer, stubs 510, 520, and 530 simultaneously perform the context switching operation corresponding to a command received from sequencer 500 (ST411, ST412, and ST414 shown in FIG. 6A). In addition, when a task stops execution, stubs 510, 520, and 530 perform the context switching operation (ST411, ST413, and ST415 shown in FIG. 6A). Moreover, when a operating task accesses a dummy transmission header queue, stubs 510, 520, or 530 re-verifies the normal transmission header queues in order to enable dynamic assignment of the normal header queue to the operating task if the normal header queue is vacant at the time (ST411, ST416, and ST417 shown in FIG. 6A).

Figure 6B:
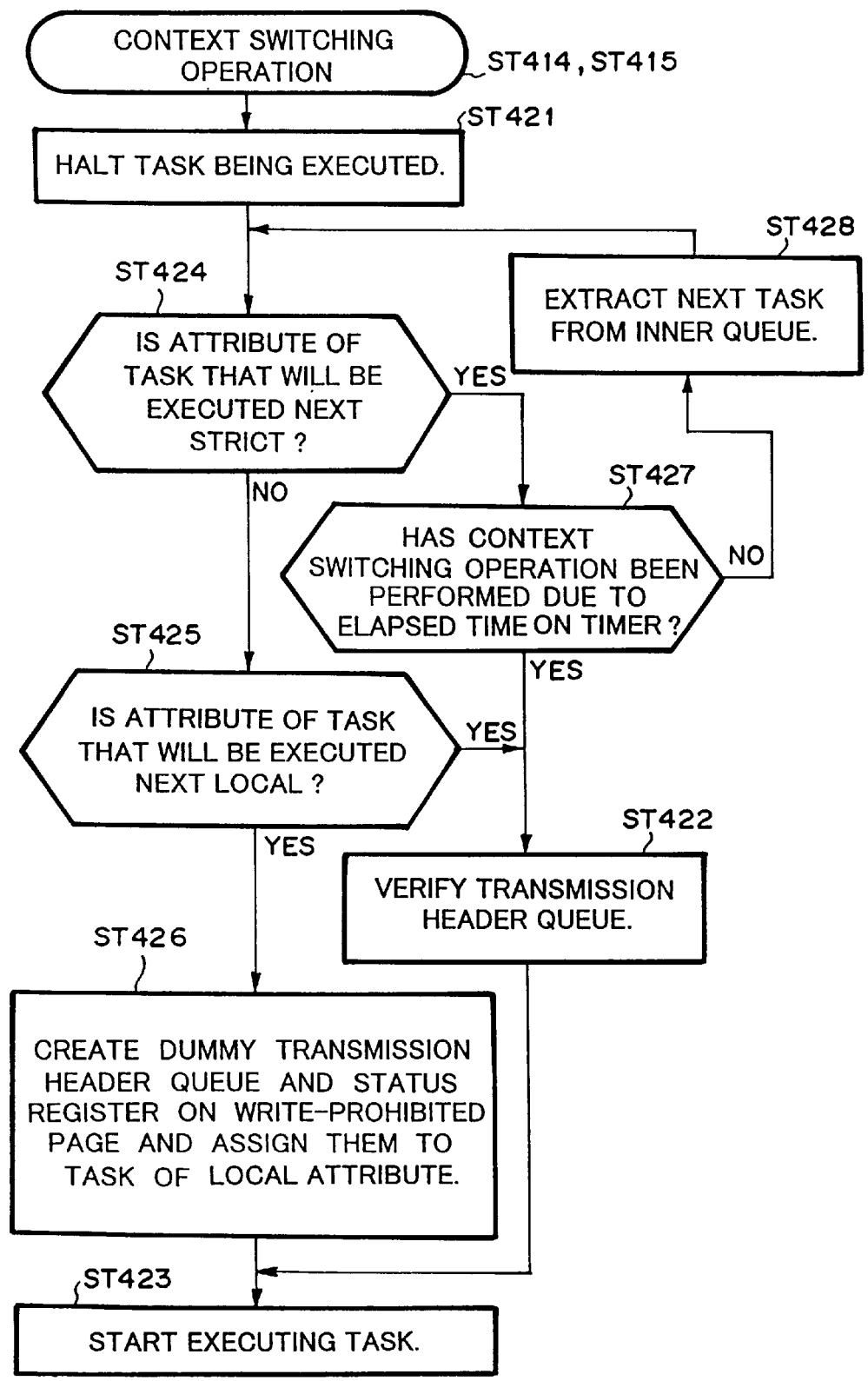

When the context switching operation is performed, stubs 510, 520, and 530 suspend tasks being executed first of all (ST421 shown in FIG. 6B).

Next, each stub determines whether or not the attribute of a task that will be executed next is Strict (ST424 shown in FIG. 6B). When the attribute is Strict and the stub performs the context switching operation due to the predetermined elapsed time on the particular timer (that is to say, the determined result at step ST427 is Yes), the stub verifies the relevant transmission header queue so that the stub can execute the task having the attribute Strict (ST422 shown in FIG. 6B). Next, the task having the attribute Strict is executed (ST423 shown in FIG. 6B). When the stub performs the context switching operation due to the stop of a task (that is to say, the determined result at step ST427 shown in FIG. 6B is No), the stub does not execute the task having the attribute Strict. In this case, the stub extracts the next task from the inner queue (ST428 shown in FIG. 6B). Thereafter, the flow returns to step ST424. The reason why the task having the attribute Strict is treated as explained above is that the tasks having attribute Strict and belonging to the same application must be executed with strict simultaneity one another.

When the attribute of the next task is not Strict (that is to say, the determined result at step ST424 shown in FIG. 6B is No), the stub determines whether or not the attribute is Local (ST425 shown in FIG. 6B). When the attribute is not Local, but GoAhead, the stub verifies the relevant transmission header queue so that the stub can start the execution of the task having the attribute GoAhead (ST422 shown in FIG. 6B). Thereafter, the stub starts execution of the task having the attribute GoAhead (ST423 shown in FIG. 6B). However, when the attribute of the task is Local, the stub omits to verify the transmission header queue and executes the task having the attribute Local (ST423 shown in FIG. 6B). This is because a task having the attribute Local does not use the NIF. In this example, for a security reason, the stub creates a dummy transmission header queue and a dummy status register that causes a user task to determine that the dummy transmission header queue is full on a write-protected page and assigns the dummy transmission header queue and the dummy status register to the task having the attribute Local (C4 shown in FIG. 5 and ST426 shown in FIG. 6B). Thus, if the task having the attribute Local tries to write a relevant header to the dummy transmission header queue (S3 shown in FIG. 5), the access is trapped (T1 shown in FIG. 5).

Figure 6C:
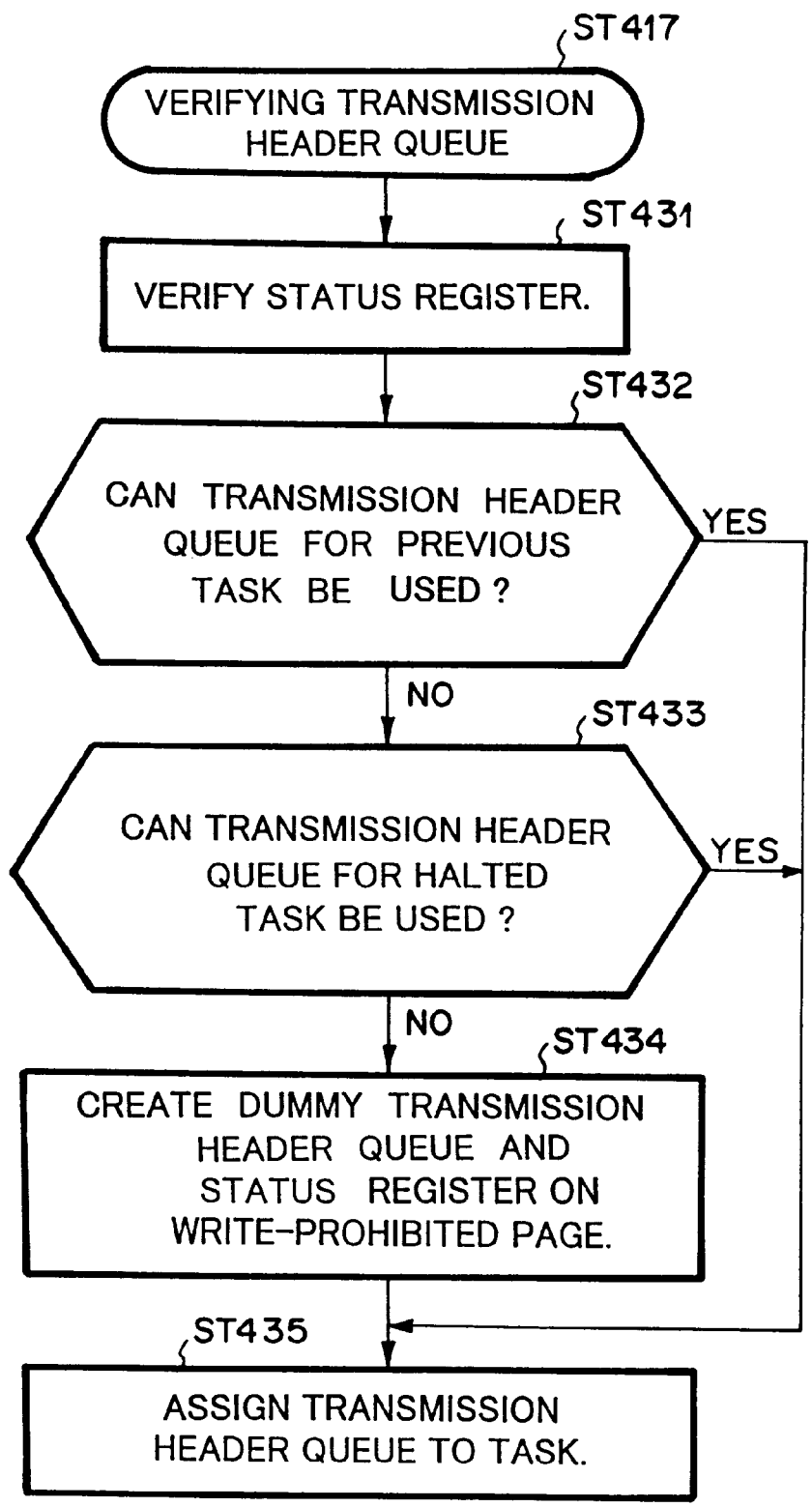

Although steps ST431 to ST433 and ST435 for verifying the transmission header queue shown in FIG. 6C are the same as those shown in FIG. 4C, step ST434 of the former is partly different from that of the latter. In other words, in the second example shown in FIGS. 6A to 6D, although a dummy transmission header queue and a dummy status register are created on a write-protected page, the dummy status register causes a relevant task to determine that the transmission header queue is vacant. Because, a dummy transmission header queue assigned to a task having the attribute Strict or the attribute GoAhead seem to be vacant, the task tries to write a header to the dummy transmission header queue (S4 shown in FIG. 5). However, since the dummy transmission header queue is present on the write-protected page, the writing operation is trapped by the OS (T2 shown in FIG. 5) and then the stub is notified of the trap of the writing operation.

When a task being executed tries to write a header to a dummy transmission header queue and thereby an access trap takes place, the stub re-verifies the normal transmission header queue (ST416 and ST417 shown in FIG. 6A). In this case, the stub determines whether or not the attribute of the task that has accessed the dummy transmission header queue is Local (ST601 shown in FIG. 6D). When the attribute of the task is Local, since the operation is invalid, the stub notifies the task that the task has tried to perform an invalid access (N1 shown in FIG. 5 and ST602 shown in FIG. 6D).

On the other hand, when the attribute of the task that has accessed the dummy transmission header queue is Strict or GoAhead, the stub executes steps ST603 to ST605 that are equivalent to step ST431 to ST433 for verifying the normal transmission header queue. When there is a vacant transmission header queue at this point, the stub assigns the vacant transmission header queue to the task, whereby the task continues execution (ST607 shown in FIG. 6D). Thus, the task can perform the inter-node communication using a normal (non-dummy) transmission header queue.

When there is no free transmission header queue, the stub causes the task to stop (ST606 shown in FIG. 6D). When the task stopped, the stub performs the context switching operation (ST413 and ST415 shown in FIG. 6A). The stub assigns the remaining time to a task having the attribute Local or a task having the attribute GoAhead. At this point, the stub assigns a dummy transmission header queue and a dummy status register created on a write-protected page to the relevant task. The dummy status register represents that the transmission header queue is vacant. When the task being executed performs the transmitting process, the similar operation is performed.

FIG. 7 is a block diagram showing the structure of a second example of the distributed-memory multiprocessor system according to the present invention. FIG. 7 shows a computer system having a plurality of nodes 110, 120, and 130 that are mutually connected by network 200.

Node 110 comprises processing element (CPU) 112, NIF 210, memory 111, kernel 810, sequencer 500, and stub 510. Node 120 comprises processing element 122, NIF 220, memory 121, kernel 820, and stub 520. Node 130 comprises processing element 132, NIF 230, memory 131, kernel 830, and stub 530. In FIG. 7, sequencer 500 is disposed in the 110. Alternatively, the sequencer 500 may be disposed in another node or outside the nodes.

Node 120 has user tasks 621 to 623. Node 130 has user tasks 631 to 633. User tasks 621 and 631 belong to the same application. User tasks 622 and 632 belong to the same application. User tasks 623 and 633 belong to the same application. Node 110 also may have a user task.

Nodes 110, 120, and 130 are connected to network 200 through NIFs 210, 220, and 230, respectively.

NIFs 210, 220, and 230 comprise transmission header queues 212, 222, and 232, status registers 211, 221, and 231, transmission user CID registers 216, 226, and 236, and reception user caches 219, 229, and 239, respectively. Status registers 211, 221, and 231 manage various statuses such as the status indicating whether or not transmission header queues 212, 222, and 232 are vacant. Transmission user CID registers 216, 226, and 236 store CIDs that identify users of the transmission header queues 212, 222, and 232, respectively.

Reception buffers 740, 750, and 760 on memories 111, 121, and 131 are data reception areas for individual tasks. Reception user caches 219, 229, and 239 in NIFs 210, 220, and 230 have reception buffer pointers 217, 227, and 237 and reception user CID registers 218, 228, and 238, respectively. The reception buffer pointers 217, 227, and 237 point reception buffers 740, 750, and 760, respectively. Reception user CID registers 218, 228, and 238 store CIDs that are communication identifiers that identify the users of reception buffers 740, 750, and 760, respectively. The relation between tasks and reception buffers is managed by the OS. When a task is scheduled, one reception user cache is assigned to the task, the CID of the task is stored in the reception user CID register, and the pointer that points the reception buffer of the task is set to the reception buffer pointer. Since there is only one transmission header queue for each NIF, the number of the task to which the transmission header queue is assigned is only one. However, regardless of whether the transmission header queue has been assigned to the task, the reception user cache is assigned to the task. With the reception user cache, the task is executed.

Since there are one transmission register and a plurality of registers that store CIDs of the reception side, while a particular NIF is performing the transmitting process, a relevant stub can perform the context switching operation.

A scheduler that provides the computer system with a time-sharing environment comprises sequencer 500 and stubs 510, 520, and 530. Sequencer 500 manages the entire system. Stubs 510, 520, and 530 schedule tasks of the individual nodes according to the direction by sequencer 500.

Whenever an application is started, a CID, which is a communication identifier used in inter-node communication, is assigned to the application by CID manager 580. In addition, kernels 810, 820, and 830 are notified of the CID so that the OS can manage reception buffers in connection with the CID. Kernels 810, 820, and 830 manage reception buffers which are used by tasks that belong to individual applications and update the relation between the reception buffers and the CID to the latest state using the notified CID.

All tasks that belong to the same application have the same CID. When tasks communicate with each other, relevant NIFs use the CID as communication identifiers. In other words, network 200 and NIFs 210, 220, and 230 manage and identify inter-node communication between tasks using CIDs.

After an application is completed, CID manager 580 collects the CID assigned to the application so that the CID can be reused and the relevant kernels update the relation between the reception buffers and the CID. When the attribute of an application is Local, CID manager 580 does not assign a CID to the application because the inter-node communication is not obviously performed for the application. While an application is executed, CID manager 580 collects a CID from an application whose attribute has been changed to Local so that the CID can be reused by giving instruction to scheduler.

Figure 8:
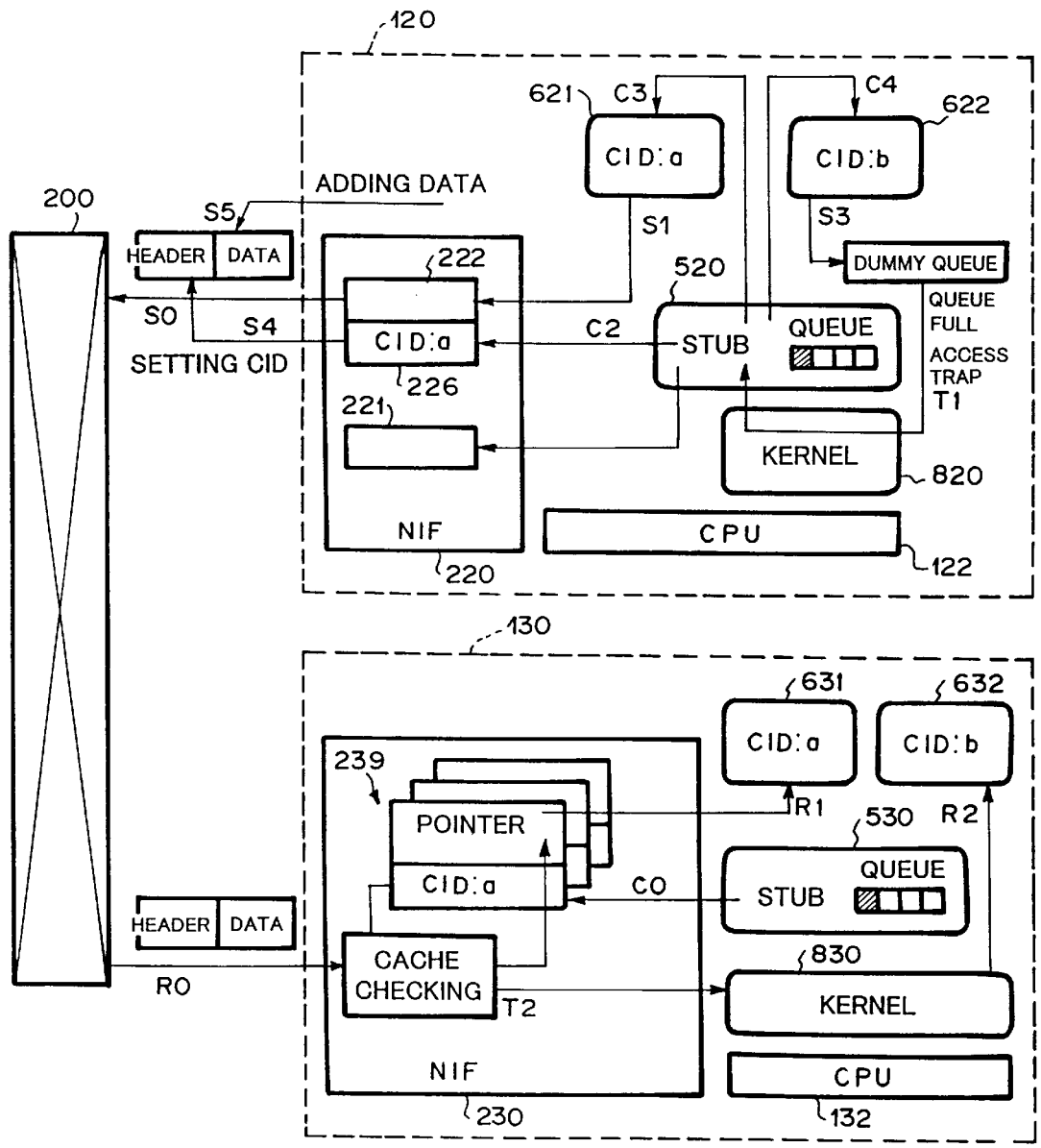
FIG. 8 is a schematic diagram for explaining an example of the operation of an inter-node communication and a scheduling operation on the distributed-memory multiprocessor system shown in FIG. 7.

FIG. 8 is a schematic diagram for explaining an example of an inter-node communication and a scheduling operation on the distributed-memory multiprocessor system shown in FIG. 7. In FIG. 8, the inter-node communication performed between node 120 and node 130 shown in FIG. 7 is explained. In this example, it is assumed that one node is a transmission side node and the other node is a reception side node. Thus, in FIG. 8, only structural elements relating to the transmitting operation and the receiving operation of these nodes are illustrated. The flow of the operations is denoted by arrows accompanying characters such as SI. In FIG. 8, structural elements of a part relating to the scheduling operation are also illustrated.

FIGS. 9A to 9C show a process of a sequencer and a process of a stub in a scheduling operation. In addition, FIG. 9A to 9C show the flow of a context switching operation performed in the process of the stub and the flow of a transmission header queue verifying operation performing in the context switching operation.

Next, with reference to FIGS. 7, 8, and 9A to 9C, an example of the scheduling operation on the distributed-memory multiprocessor system shown in FIG. 7 will be explained.

Sequencer 500 has system-scale mapping information for applications and tasks. Sequencer 500 determines a task group that will be executed next in individual nodes corresponding to the mapping information (ST401 shown in FIG. 9A). Sequencer 500 notifies stubs 510, 520, and 530 of the determined task group (ST402 shown in FIG. 9A). This notification is performed at arbitrary time until the next context switching operation is performed.

Stubs 510, 520, and 530 have local schedule management queues in respective nodes (stub 520 shown in FIG. 8). When the predetermined time has elapsed on a particular timer, stubs 510, 520, and 530 simultaneously perform the context switching operation (ST411, ST412, and ST413 shown in FIG. 9A) according to the instruction from sequencer 500. When a task being executed stop, stub 510, 520, or 530 performs the context switching operation (ST411, ST413, and ST415 shown in FIG. 9A).

At the beginning of the context switching operation, stubs 510, 520, and 530 stop tasks being executed (ST421 shown in FIG. 9B). Thereafter, in order to assign transmission header queues to individual tasks that will be executed next, stubs 510, 520, and 530 verify the transmission header queues of the NIFs 210, 220, and 230 of the respective nodes (ST422 shown in FIG. 9B).

In the verification of the transmission header queues, stubs 510, 520, and 530 verify status registers 211, 221, and 231 of NIFs 210, 220, and 230, respectively (ST431 shown in FIG. 9C). Each stub determines whether or not the relevant sole transmission header queue can be used (ST432 shown in FIG. 9C). When the transmission header queue can be used, the stub assigns the transmission header queue to a task that will be executed next (C3 shown in FIG. 8 and ST435 shown in FIG. 9C). At this point, the stub notifies relevant NIF 210, 220, or 230 of the CID of the application to which the task belongs as the identifier of the user of the transmission header queue (C2 shown in FIG. 8). The CID is stored in relevant transmission user CID register 216, 226, or 236.

When the transmission header queue has been used (that is to say, the determined result at step ST432 shown in FIG. 9C is No), relevant stub 510, 520, or 530 creates a write-protected page in a virtual address space and generates a dummy transmission header queue and a dummy status register on the page (ST434 shown in FIG. 9C). The dummy status register causes the user task to determine that the dummy transmission header queue is full. Thereafter, the stub assigns the dummy transmission header queue to the task that will be executed next (C4 shown in FIG. 8 and ST435 shown in FIG. 9C). At this point, since the stub does not assign a normal (non-dummy) transmission header queue to the task, the stub does not update the transmission user CID register.

Next, regardless of whether or not the stub has successfully assigned the transmission header queue to the task, the stub assigns one reception user cache 219, 229, or 239 to the task that will be executed next, writes the CID of the task to receiver user CID register 218, 228, or 238 and sets reception buffer pointer 217, 227, or 237 to point to reception buffer 740, 750, or 760. At this point, if the stub assigns the reception user cache that has not been used for the longest time, effective communication can be established.

Thereafter, the stub executes the next task (ST423 shown in FIG. 9B).

FIG. 10 is a flow chart showing a process of a transmission side user task, a process of a transmission side NIF, and a process of a reception side NIF in an inter-node communication for transmitting and receiving data between a task of the transmission side node and a task of the reception side node. FIG. 10 also shows an interruption processing of a reception side OS.

Next, with reference to FIGS. 7, 8, and 10, the inter-node communication on the distributed-memory multiprocessor system shown in FIG. 7 will be explained. In the following explanation, the inter-node communication performed between node 120 and node 130 will be explained. However, the inter-node communication can be performed between any nodes.

When the schedulers (stubs 520 and 530) schedule tasks 621, 622, 631, and 632 of nodes 120 and 130, the schedulers assign transmission header queues 222 and 223 of NIFs 220 and 230 of nodes 120 and 130 or the dummy transmission header queues, respectively. FIG. 8 shows that transmission header queue 222 has been assigned to task 621 and that the dummy transmission header queue has been assigned to task 622 (C3 and C4 shown in FIG. 8).

The schedulers (stubs 520 and 530) store the CIDs of the tasks (users) to which the transmission header queues have been assigned to transmission user CID registers 226 and 236 of NIFs 220 and 230, respectively. For example, assuming the CID which have been assigned to the application to which task 621 belongs is a, the CID assigned to transmission user CID 226 in node 120 is a as denoted by C2 shown in FIG. 8.

Task 621 in node 120 communicates with task 631 in node 130. Task 622 in node 120 communicates with task 632 in node 130. Before the tasks start communication, they require kernels 820 and 830 to map registers (such as transmission register queues) of NIFs 220 and 230 to the respective virtual address spaces, respectively (shown in FIG. 7). Thereafter, these tasks operate NIFs 220 and 230 by accessing the mapped registers 225 and 235 without an intervention of the OS.

Now, it is assumed that task 621 in node 120 transmits data to task 631 in node 130 and task 622 in node 120 transmits data to task 632 in node 130.

When task 621 on the transmission side transmits data, task 621 references status register 221 corresponding to assigned transmission header queue 222. Unless transmission header queue 222 is full, task 621 creates a header having a destination node, a destination address, data, and so forth (ST901 shown in FIG. 10) and writes the header to transmission header queue 222 through mapped register 225 (S1 shown in FIG. 8 and ST902 shown in FIG. 10).

When the header has been written to transmission header queue 222, transmission side NIF 220 reads the header from the transmission header queue (ST911 shown in FIG. 10) and places the CID (CID : a in FIG. 8) stored in transmission user CID register 226 to the header (ST912 shown in FIG. 10) and transmits the header as a packet to node 130 through network 200 (ST915 shown in FIG. 10).

Besides the headers, data stored in the memory of task 621 may be transmitted. In this case, task 621 writes the address of the area where transmission data is written in the memory of task 621 to the header to be written to transmission header queues 222. When NIF 220 detects such address, NIF 220 obtains data corresponding to the address (ST914 shown in FIG. 10) and adds the data to the header (ST915 shown in FIG. 10) before transmission.

When NIF 230 in reception side node 130 has received the packet (R0 shown in FIG. 8), NIF 230 analyzes the header of the packet and reads the CID from the header (ST921 shown in FIG. 10) and examines whether or not reception user cache 239 that has reception user CID register 238 that stores the received CID is present (ST922 and ST924 shown in FIG. 10). When NIF 230 detects reception user cache 239 that has the reception user CID that is identical with the received CID, NIF 230 writes the received data to reception buffer 760 to which reception buffer pointer 237 of reception user cache 239 points (ST923 shown in FIG. 10).

When all the reception user caches 239 do not have the reception user CID that is identical with the received CID, NIF 230 generates interrupt to kernel 830 (T2 shown in FIG. 8 and ST925 shown in FIG. 10). Kernel 830 obtains the pointer to the reception buffer of task 631 by referring to the relation between CIDs of various tasks and reception buffers which kernel 830 manages (ST931 shown in FIG. 10), copies the received data to the reception buffer (ST932 shown in FIG. 10), and quit the interrupt handling routine (ST933 shown in FIG. 10).

On the other hand, since task 622 in node 120 determines that the (dummy) transmission header queue assigned to task 622 is full by examining the dummy status register, task 622 does not transmit data. If task 622 tries to write a header to the dummy transmission header queue ignoring the dummy status register, since the dummy transmission header queue has been created on a write-protected page, an access trap takes place (T1 shown in FIG. 8).

Next, some examples of CID managing methods of the present invention will be explained.

With reference to FIGS. 11 and 12, a first example of CID managing method for the distributed-memory multiprocessor system shown in FIG. 1 or 7 will be explained.

It is assumed that an application composed of three tasks 611, 621, and 631 which are executed in three nodes 110, 120, and 130 shown in FIG. 11, respectively, obtains a CID, performs a communicating process, and releases the CID.

User tasks 611, 621, and 631 get started without a CID assigned thereto. Before performing the communicating process, user tasks 611, 621, and 631 perform a synchronizing process through a communicating function in the system level provided by kernels 810, 820, and 830 (ST1201 shown in FIG. 12). Task 611 that is a representative task requests CID manager 580 to assign a CID to the application (ST1202 shown in FIG. 12). Task 611 autonomously suspends after user task 611 has issued the request. On the other hand, tasks 621 and 631 suspends immediately after performing the synchronizing process (ST1203 shown in FIG. 12).

CID manager 580 receives the CID assignment request from task 611 (ST1211 and ST1212 shown in FIG. 12) and assigns a CID to task 611. As shown in FIG. 11, CID manager 580 manages vacant CIDs by using CID managing queue 581. Each entry of CID managing queue 581 is composed of free CID 582 and time stamp (TS) 583. TS 583 represents time when relevant CID 582 is released. TS 583 is used so that CID manager 580 does not re-assign the CID that has been released until the CID disappears from the network. When TS 583 represents that the sufficient time has elapsed after the CID has disappeared (that is to say, the determined result at step ST1214 shown in FIG. 12 is Yes), CID manager 580 assigns CID 582 to a task. When sufficient time has not elapsed, (that is to say, the determined result at step ST1214 shown in FIG. 12 is No), CID manager 580 does not assign CID 582 to a task. When CID manager 580 has successfully assigned CID 582 to the task, CID manager 580 notifies stubs 510, 520, and 530 of the successful assignment of CID 582 (ST1215 shown in FIG. 12). When CID manager 580 has canceled the assignment of CID 582 to the task, CID manager 580 notifies stubs 510, 520, and 530 of the cancellation of the assignment of CID 582 (ST1217 shown in FIG. 12). When CID manager 580 has canceled the assignment of CID 582 to the task, CID manager 580 records the cancellation to an inner management table (not shown). At the time when TS 583 of the top entry of CID managing queue 581 gets to represent sufficient elapsed time, CID manager 580 assigns the CID to a task and notifies stubs 510, 520, and 530 of the assignment of the CID.

When stubs 510, 520, and 530 have received the notification of the assignment of the CID to the task (ST1221 and ST1222 shown in FIG. 12), stubs 510, 520, and 530 update respective maps between tasks and CIDs (ST1223 shown in FIG. 12). Stubs 510, 520, and 530 confirm that tasks 611, 621, and 631 that have been suspended can be executed and schedule them with the assigned CID from the next scheduling time (ST1226 shown in FIG. 12).

Thus, user tasks 611, 621, and 631 get started again and perform the communicating process (ST1204 shown in FIG. 12).

After each task stops and then a CID becomes valid, each stub schedule the task. Thus, each task can be prevented from communicating without a CID assigned.

Next, a CID releasing operation for releasing the CID assigned to tasks 611, 621, and 631 when communication has completed will be explained.

In common with the CID assigning process, after tasks 611, 621, and 631 have synchronized with one another (ST1205 shown in FIG. 12), representative task 611 sends a CID release request to CID manager 580 (ST1206 shown in FIG. 12). After tasks 611, 621 and 631 have synchronized, they do not communicate with one another. Thus, before CID manager 580 releases the CID, tasks 611, 621, and 631 continuously perform their respective processes. Consequently, after tasks 611, 621, and 631 synchronize with one another, they do not suspend their respective processes.

The CID manager 580 receives the CID release request from task 611 (ST1211 and ST1213 shown in FIG. 12), release the CID, and appends an entry having a TS that represents the released time and the released CID to the end of CID managing queue 581. CID manager 580 notifies stubs 510, 520, and 530 of the release of the CID (ST1216 shown in FIG. 12).

Then, stubs 510, 520, and 530 updates the respective maps between the tasks and the CIDs (ST1223 shown in FIG. 12). Thereafter, stubs 510, 520, and 530 verify the respective NIFs and determine whether or not the released CID is used yet. When the released CID is used yet, stubs 510, 520, and 530 perform the CID releasing process (ST1225 shown in FIG. 12).

CID manager 580 has reserved CID0 for the OS. In other words, CID0 is not assigned to a user (an application).

In the above explanation, one CID manager manages all CIDs. Alternatively, a plurality of CID managers can manage CIDs. Next, such a distributed CID managing method that is a second example of CID managing method will be explained.

Figure 13:
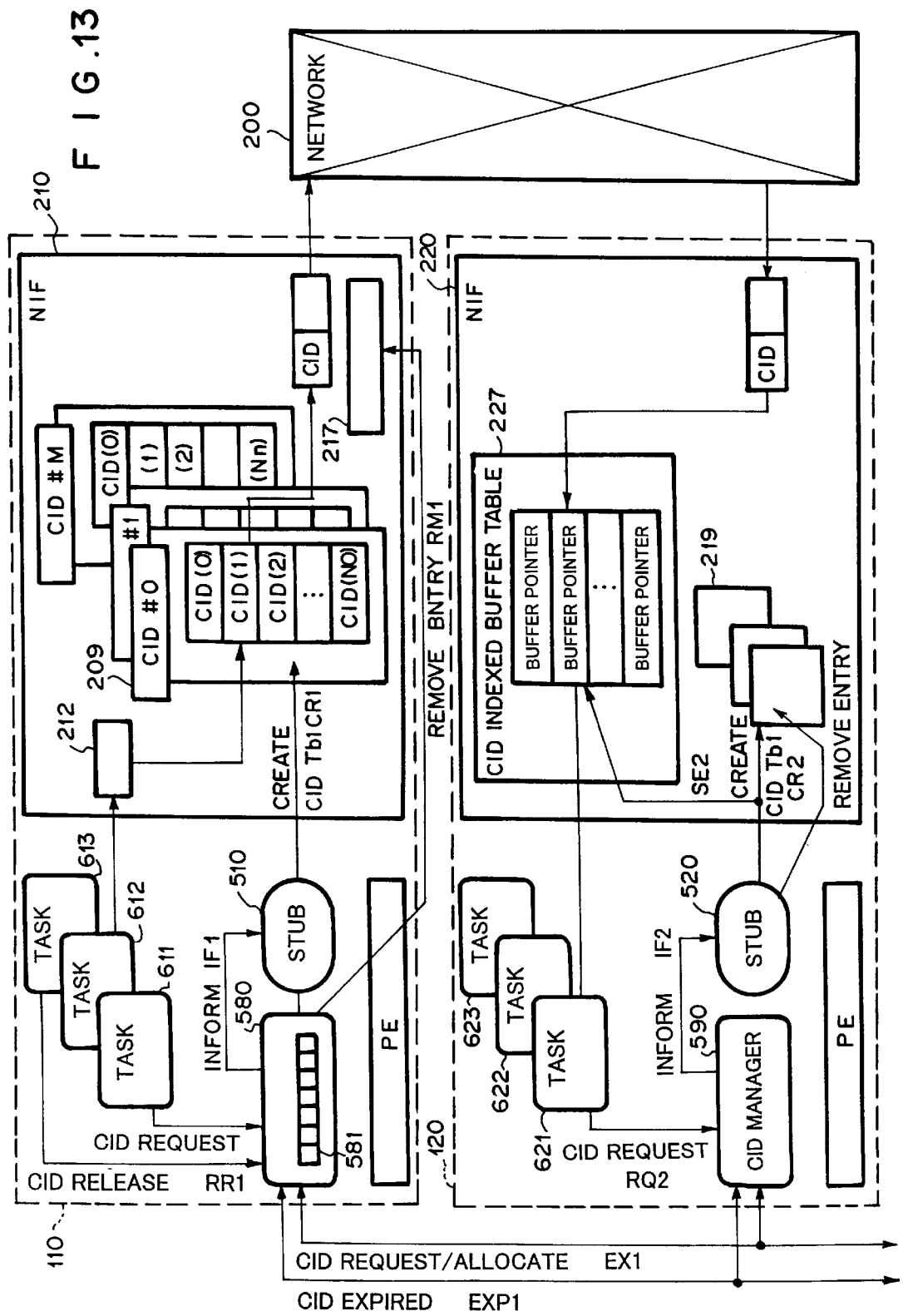
FIG. 13 is a schematic diagram for explaining a second example of the CID managing method according to the present invention.

With reference to FIG. 13, a CID distributed managing method performed by CID managers 580 and 590 disposed in individual nodes will be explained.

In FIG. 13, an example which tasks 611 and 621 that belong to the same application executed across nodes 110 and 120 communicate with each other will be explained.

Before tasks 611 and 621 communicate with each other, they send CID assignment requests (RQ1 and RQ2) to CID managers 580 and 590, respectively.

CID managers 580 and 590 manage CID resources of their respective nodes by using CID managing queues 581. When task 611 or 621 has sent the CID assignment request RQ1 or RQ2 to CID manager 580 or 590, CID manager 580 or 590 communicates with CID manager 590 or 580 which belongs to the node where the communication partner of the task which has sent the CID assignment request exists and CID managers 580 and 590 exchange CIDs available in both nodes (EX1).

CID managers 580 and 581 register the exchanged CIDs to CID tables 209 and 219 using partner node numbers as keys (CR1 and CR2), respectively. The tasks have respective CID tables 209 and 219. CID managers 580 and 581 also register reception buffer pointer corresponding to the CID assigned according to the request from other node to reception buffer pointer table 217 and 227 (SE2). The information of reception buffer pointer tables 217 and 227 are sent to stubs 510 and 520, respectively (IF1 and IF2).

When task 611 has written a header to transmission header 212, NIF 210 reads information of the partner node from the header, retrieves a CID table of task 611 from a CID table group, obtains a CID of the partner node, places the CID to the header, and transmits the header as a packet to network 200.

After node 120 has received the packet from network 200, NIF 220 of node 120 extracts the CID from the packet, extracts a reception buffer pointer corresponding to the CID from reception buffer pointer table 227, and writes the received data to a reception buffer pointed by the extracted reception buffer pointer.

Next, a CID releasing operation will be explained using an example in which task 613 in node 110 returns a CID after completing a series of communication with other nodes.

Task 613 returns the CID to CID manager 580 in local node 110 to which task 613 belong (RR1). CID manager 580 receives the CID and notifies individual CID managers in respective nodes relevant to task 613 that the CID has become expired (EXP1).

CID manager 590 of node 120 retrieves CID table 219 of task 623 from a CID table group and deletes the relevant CID entry from CID table 219 (RM2) in order to expire the CID. Thereafter, CID manager 590 notifies CID manager 580 of the completion of the deletion.

When CID manager 580 has received the notification of the completion of the deletion from all partner nodes, CID manager 580 deletes the entry corresponding to the returned CID from reception buffer pointer table 217 in the local node 110 (RM1). At this point, CID manager 580 stamps a time to the CID and appends the resultant CID to the end of free CID managing queue 581 of CID manager 580. After a sufficient timeout period has elapsed, the CID can be reused. If it is assured that the relevant packet is not passed by another packet which heads to the same destination, it is certain that there is no packet having the relevant CID on the network when the notification of the completion of the deletion is received. In this case, the timeout period may be set zero and therefore it is not necessary to stamp a time to the CID to be appended to CID managing queue 581.

As explained above, CID manager 590 deletes an entry from reception buffer pointer table 217 after the partner nodes have deleted the relevant CID. This operation is adapted to maintain the safety against the case that data transmission takes place after the notification of expired CID was issued and before the processes of the notification have completed in the partner nodes. An alternative method is to leave reception buffer pointer table 217 unchanged at the time when the expired CID is appended to CID managing queue 581 and to update reception buffer pointer table 217 at the time when the expired CID is reused. In this method, it is not necessary for CID manager 580 to wait for the notification of completion of deletion, but the notification of the expired CID.

The inter-node communication and the scheduling operation according to the present invention can be applied to a cluster-type distributed-memory multiprocessor system as well as the distributed-memory multiprocessor systems shown in FIG. 1 and 7. The cluster-type distributed-memory multiprocessor system comprises a plurality of clusters and each cluster comprises a plurality of nodes. Next, a CID managing method for such a cluster-type distributed-memory multiprocessor system will be explained.

Next, with reference to FIGS. 14 and 15, a first example of the CID managing method for the cluster-type distributed-memory multiprocessor system will be explained. This example is characterized in the mechanism that assigns reserved CID regions to the global communication which spread over the whole system in addition to the method for managing CIDs in each cluster.

Figure 14:
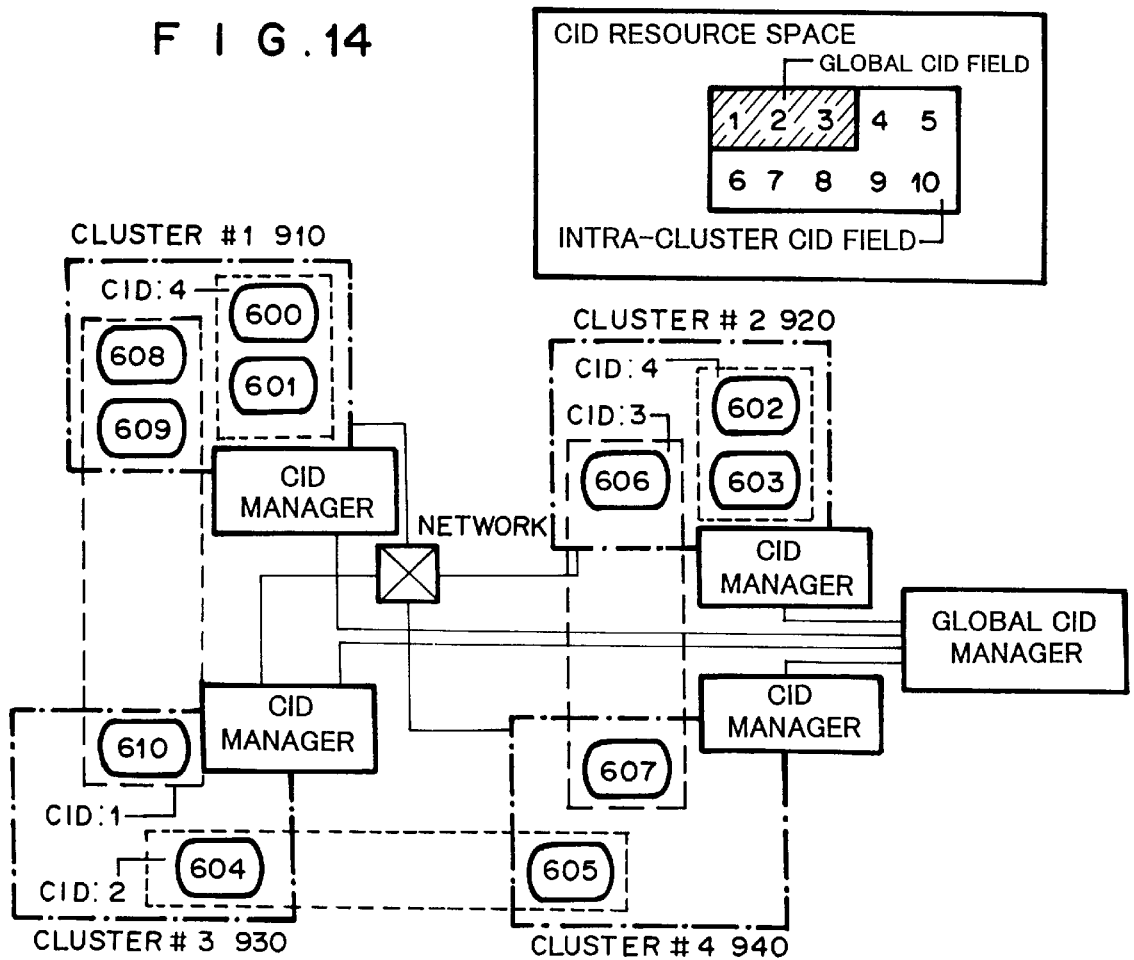
FIG. 14 is a schematic diagram for explaining a first example of the CID managing method in a cluster-type distributed-memory multiprocessor system according to the present invention.

FIG. 14 shows a system comprising clusters 910, 920, 930, and 940. In this system, there are 10 CID fields. CID fields 1 to 3 are reserved for global communications and assigned to a global CID managing process. On the other hand, CID fields 4 to 10 are used for intra-cluster communications and assigned to an intra-cluster CID managing process. In FIG. 14, an application composed of tasks 600 and 601 is enclosed in cluster 910. An application composed of tasks 602 and 603 is enclosed in cluster 920. CIDs for the two applications are assigned to and collected from the two applications by their respective CID managers. In the example shown in FIG. 14, the same CID, namely CID4, is assigned to the application composed of tasks 600 and 602 and the application composed of tasks 602 and 603. However, the communication of each of the applications do not spread over clusters. Therefore, no problem is caused. On the other hand, since tasks 604 to 610 communicate across clusters, CIDs are assigned to and collected from tasks 604 to 610 by the global CID managing process. In this case, CID1 to CID3 assigned for the global CID managing process are used.

Figure 15:
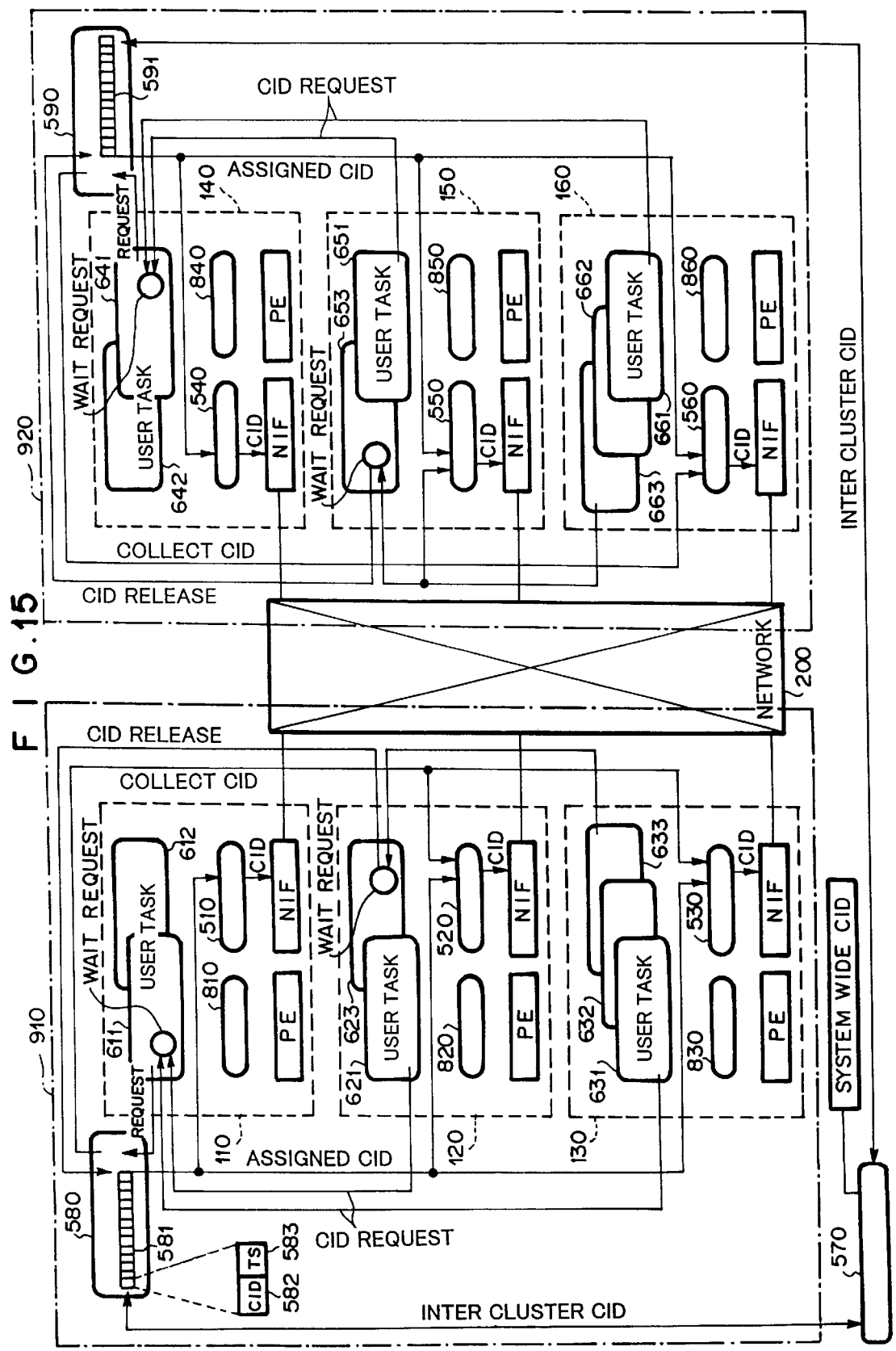
FIG. 15 is a block diagram showing an example of the structure of the cluster-type distributed-memory multiprocessor system using the CID managing process shown in FIG. 14.

FIG. 15 is a schematic diagram for explaining a CID managing process for clusters 910 and 920. System CID manager 570 shown in FIG. 15 manages a global CID managing process shown in FIG. 14. CID managers 580 and 590 of the clusters 910 and 920 manage the intra-cluster CID managing process shown in FIG. 14, respectively.

In FIG. 15, cluster 910 is composed of three nodes 110, 120, and 130. Cluster 920 is composed of three nodes 140, 150, and 160.

In the cluster system, application 1 is composed of user tasks 611, 621, 631, 641, 651, and 661. Application 2 is composed of user tasks 612 and 632. Application 3 is composed of user tasks 622 and 633. Application 4 is composed of user tasks 642 and 662. Application 5 is composed of user tasks 653 and 663. Applications 2 and 3 are executed in cluster 910. Applications 4 and 5 are executed in cluster 920. Application 1 is executed across clusters 910 and 920.

CID managers 580 and 590 individually manage CIDs and perform an intra-cluster communicating process. A predetermined portion of the CID space is reserved for global communications of the entire system and managed by system CID manager 570. In other words, a part of the CIDs is reserved as CIDs spreading the entire system and the rest of the CIDs are used as intra-cluster CIDs. An application to which a CID spreading the entire system is assigned can perform inter-cluster communication.

User tasks 612, 623, 632, and 633 executed in nodes 110, 120, and 130 of cluster 910 requests CID manager 580 to assign CIDs to user tasks 612, 623, 632, and 633. After CIDs has been assigned to user tasks 612, 623, 632, and 633 and the process thereof has been completed, user tasks 612, 623, 632, and 633 return the CIDs to CID manager 580.

Similarly, user tasks 642, 653, 662, and 663 executed in nodes 140, 150, and 160 of cluster 920 requests CID manager 590 to assign CIDs to user tasks 642, 653, 662, and 663. After CIDs has been assigned to user tasks 642, 653, 662, and 663 and the process thereof has been completed, user tasks 642, 653, 662, and 663 return the CIDs to CID manager 590.

Each task of application 1 executed in both of clusters 910 and 920 requests the CID manager in the relevant cluster to assign/release a CID to/from the task. In other words, user tasks 611, 621, and 631 request CID manager 580 in cluster 910 to assign a CID thereto. Similarly, user tasks 641, 651, and 661 request CID manager 590 in cluster 920 to assign a CID thereto.

CID managers 580 and 590 request system CID manager 570 to assign/release a CID spreading the entire system (global CID) thereto. Thus, global CIDs are assigned/released to/from user tasks in each cluster.

Next, with reference to FIGS. 16 and 17, a second example of the CID managing method for the cluster-type distributed-memory multiprocessor system will be explained. Unlike the first example shown in FIGS. 14 and 15, in the second example shown in FIG. 16 and 17, clusters that performs an inter-cluster communication dynamically assign CIDs (that is to say, global CIDs are not reserved). Thus, the same CID can be assigned to applications enclosed in their respective clusters and applications spreading across clusters as long as the same CID does not duplicate in a certain cluster, whereby CID resource can be effectively used.

Figure 16:
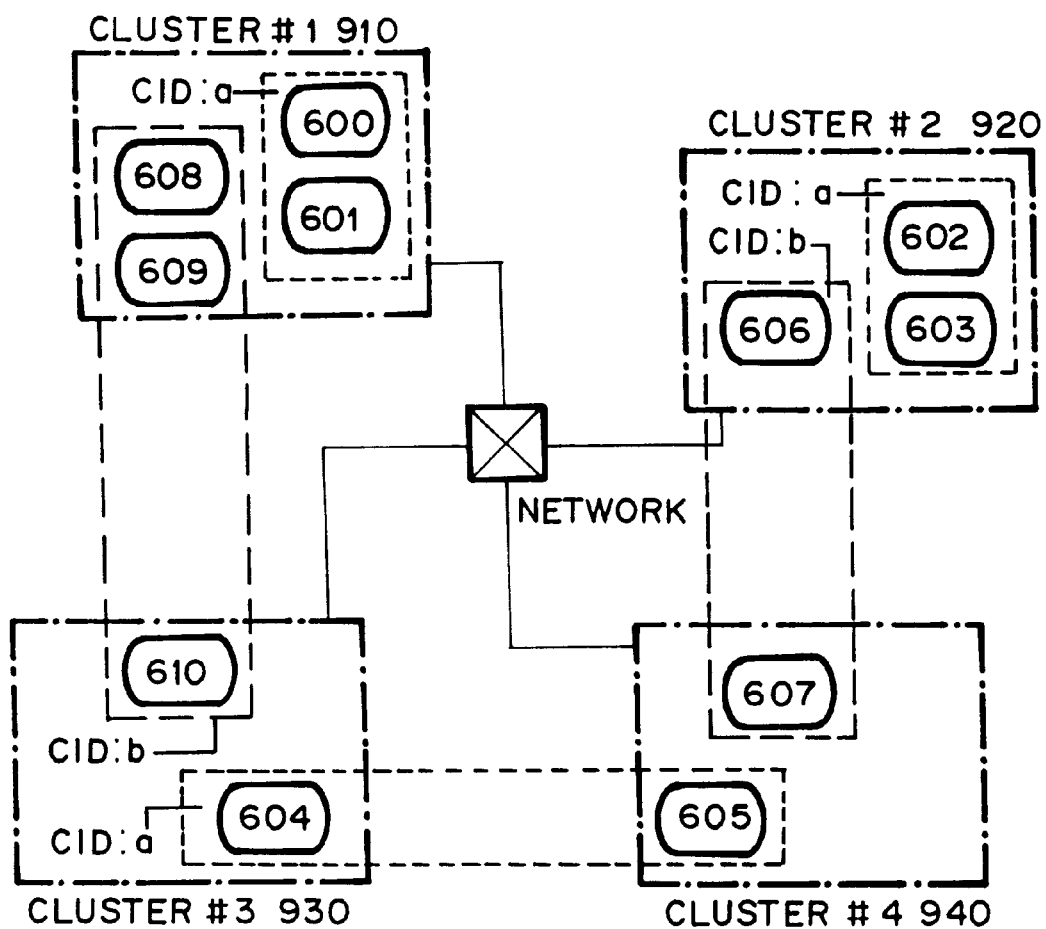
FIG. 16 is a schematic diagram for explaining a second example of the CID managing method in a cluster-type distributed-memory multiprocessor system according to the present invention.
Figure 17:
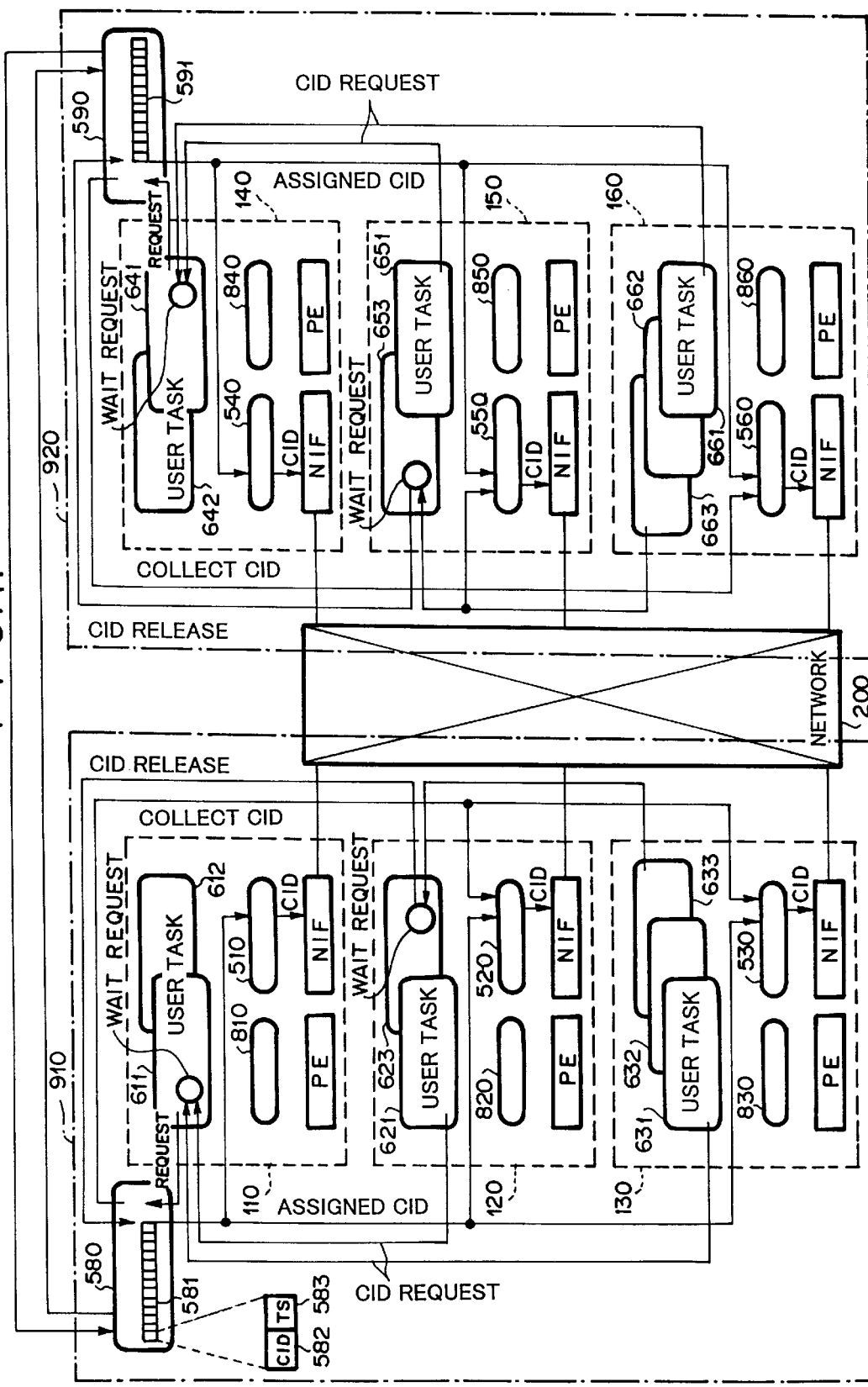
FIG. 17 is a block diagram showing an example of the structure of the cluster-type distributed-memory multiprocessor system using the CID managing process shown in FIG. 16.

With reference to FIG. 16, the system is composed of clusters 910, 920, 930, and 940. Tasks 600, 601, 608, and 609 belong to cluster 910. Tasks 602, 603, and 606 belong to cluster 920. Tasks 604 and 610 belong to cluster 930. Tasks 605 and 607 belong to cluster 940. Tasks 600 and 601 belong to an application enclosed in cluster 910. Tasks 602 and 603 belong to an application enclosed in cluster 920. Tasks 604 and 605 belong to an application spreading across clusters 930 and 940. Tasks 606 and 607 belong to an application spreading across clusters 920 and 940. Tasks 608 to 610 belong to an application spreading across clusters 910 and 930. In this case, a CID(a) can be assigned to the pair of tasks 600 and 601, the pair of tasks 602 and 603, and the pair of tasks 604 and 605 because CID(a) is unique in each cluster. Likewise, a CID(b) can be assigned to the pair of tasks 606 and 607 and the set of tasks 608 to 610.

Next, with reference to FIG. 17, concrete CID assigning/releasing methods will be explained. FIG. 17 is a schematic diagram for explaining a CID managing method for clusters 910 and 920. In this example, cluster 910 is composed of three nodes 110, 120, and 130. Cluster 920 is composed of three nodes 140, 150, and 160.

In the cluster system, application 1 is composed of user tasks 611, 621, 631, 641, 651, and 661. Application 2 is composed of user tasks 612 and 632. Application 3 is composed of user tasks 623 and 633. Application 4 is composed of user tasks 642 and 662. Application 5 is composed of user tasks 653 and 663. Applications 2 and 3 are executed in cluster 910. Applications 4 and 5 are executed in cluster 920. Application 1 is executed across clusters 910 and 920.

CID managers 580 and 590 independently manage CIDs in the respective clusters. CID managers 580 and 590 arbitrates and assign CIDs that are used for inter-cluster communications.

User tasks 612, 623, 632, and 633 executed in nodes 110, 120, and 130 of cluster 910 requests CID manager 580 to assign CIDs to user tasks 612, 623, 632, and 633. After CIDs has been assigned to user tasks 612, 623, 632, and 633 and the process thereof has been completed, user tasks 612, 623, 632, and 633 return the CIDs to CID manager 580.

Similarly, user tasks 642, 653, 662, and 663 executed in nodes 140, 150, and 160 of cluster 920 requests CID manager 590 to assign CIDs to user tasks 642, 653, 662, and 663. After CIDs has been assigned to user tasks 642, 653, 662, and 663 and the process thereof has been completed, user tasks 642, 653, 662, and 663 return the CIDs to CID manager 590.

Each task of application 1 executed in both of clusters 910 and 920 requests the CID manager in the relevant cluster to assign/release a CID to/from the task. In other words, user tasks 611, 621, and 631 request CID manager 580 in cluster 910 to assign a CID thereto. Similarly, user tasks 641, 651, and 661 request CID manager 590 in cluster 920 to assign a CID thereto.

CID managers 580 and 590 arbitrate the request for assignment/release of global CIDs each other. In other words, when CID manager 590 receives a request for CID assignment from a task, CID manager 590 inquires CID manager 580 whether a CID selected as a candidate for global CID from unused CID in CID manager 590 is assignable in CID manager 580. If the selected CID is assignable in CID manager 580, CID managers 580 and 590 uses the selected CID as global CID. Concerning the release of global CID, when CID managers 580 and 590 receive the request for release of a global CID from the tasks in their respective clusters, CID managers 580 and 590 release the global CID.

The method explained above may be realized by a computer program product including instructions, which causes a distributed-memory multiprocessor system to perform the functions or methods explained above. In this case, such computer program product comprises a computer readable record medium such as a CD-ROM, a magnetic disc, or a semiconductor memory.

As explained above, according to the present invention, the following effects can be obtained.

A context switching operation can be quickly performed among user tasks in a distributed-memory multiprocessor system. The reason is explained as follows: Each node has a plurality of data receiving areas having unique communication identifiers and data is stored in a data reception area corresponding to a communication identifier. Thus, when the context switching operation is performed (that is to say, a user task of a particular application of each node is stopped and then another user task of another application is executed), regardless of whether or not transmission data of a former user task is present on the network or in reception buffers, as long as a transmission resource is available, the context switching operation can be securely performed. Consequently, the overhead of the context switching operation can be alleviated.

In each node, user tasks whose total number exceed the number of transmission resources can be executed at a time. Thus, the multiplexing degree of user tasks is improved. The reason is explained as follows: Just after each user task gets started, it does not start a communicating process. When the context switching operation is performed, if a relevant NIF does not have a transmission resource that can be assigned to a user task that will be executed next, a dummy transmission resource is assigned to the user task and the user task gets started.

Even if a dummy transmission resource is assigned to a user task, it can perform a communicating process depending on a situation. The reason is explained as follows: When a user task has accessed a dummy transmission resource, transmission resources of a relevant NIF are re-verified. If the NIF has a transmission resource that can be assigned to the user task, the transmission resource is assigned to the user task instead of the dummy transmission resource. Thus, the user task can be continuously executed.

When the context switching operation is performed, if the attribute of a user task that will be executed next is Local, a dummy transmission resource is always assigned to the user task. Thus, the verifying operation of transmission resources that can be assigned can be omitted. Consequently, the process can be effectively performed.

Before an application starts a communicating process, a CID manager assigns a communication identifier to the application. After the application has completed the communicating process, the CID manager collects the communication identifier so that it can be reused. Thus, a limited number of communication identifiers can be effectively used.

With a scheduler having a sequencer that manages mapping of applications and user tasks and that schedules a task group executed across nodes and a stub that performs a context switching operation for a task in the local node corresponding to the command received from the sequencer, the sequencer sends a scheduler to each stub asynchronously with the context switching operation. Thus, the communication cost of the sequencer is concealed. Consequently, the overhead of the scheduling operation can be alleviated.

Although the present invention has been shown and explained with respect to the preferred mode embodiments thereof, it should be understood by those skilled in the art that the foregoing and various other changes, omissions, and additions in the form and detail thereof may be made therein without departing from the spirit and scope of the present invention.

What is claimed is:

1. A method for controlling a distributed-memory multiprocessor system having a plurality of nodes mutually connected by a network, each of said nodes having a CPU and a memory, and a plurality of user tasks which belong to the same application and are executed in different nodes, which method comprises the steps of:

(a) assigning a transmission resource of a network interface in said node to a user task that will be executed next and starting the execution of said user task when a context switching operation is performed;

(b) reading data written by said user task from said transmission resource, adding to said data a communication identifier that is assigned to an application to which said user task belongs and that identifies a data reception area, and transmitting the resultant data to a reception side node through said network, in said network interface of each transmission side node; and (c) selecting a data reception area for storing data received from another node from a plurality of data receiving areas on the basis of said communication identifier added to said received data and storing said received data in said selected data reception area, in said network interface of each reception side node.

2. The method as set forth in claim 1, wherein the step (a) comprises the step of (a1) assigning a dummy transmission resource to said user task which will be executed next so that said user task can be executed when said network interface does not have a transmission resource that can be assigned to said user task in the context switching operation.

3. The method as set forth in claim 2, wherein the step (a1) ) is followed by the step of:

(a2) re-determining whether or not said network interface has a transmission resource that can be assigned to said user task when the user task accesses said dummy transmission resource, assigning said transmission resource instead of said dummy transmission resource to said user task when said network interface has the transmission resource that can be assigned to said user task, and continuously executing said user task.

4. The method as set forth in claim 1, wherein the step (a) comprises the step of:

(a1) storing the relation between said communication identifier for said user task which will be executed next and a pointer which points to said data reception area for said user task to a cache of said local network interface on said reception side node; and wherein the step (c) comprises the step of (c1) retrieving said data reception area for storing said received data from said cache using said communication identifier added to said received data as a key, and selecting said data reception area to which said received data is written.

5. The method as set forth in claim 4, wherein said network interface generates interrupt which causes said OS to store said received data when there is not a cache having the communication identifier identical with said identifier added to said received data.

6. The method as set forth in claim 3, wherein the step (a2) is performed only when the attribute of said user task is other than the attribute of Local which represents that said user task does not execute communication using said network interface.

7. The method as set forth in claim 1, wherein the step (a) is performed by assigning a dummy transmission resource to said user task which will be executed next and starting execution of said user task when said user task has the attribute of Local which represents that said user task does not execute communication using said network interface.

8. The method as set forth in claim 1, wherein said data reception area is a page in a virtual address space and a page table stores the address of said page as a data reception area; and wherein the step (c) is performed by retrieving a page as a data receiving area for storing received data from said page table using said communication identifier added to said received data as a key, and selecting said data reception area, in said network interface of said each reception side node.

9. The method as set forth in claim 1, further comprising the step of:

(d) causing a CID manager for managing said communication identifiers to assign a communication identifier to an application before said application performs a communicating process and;

(e) causing said CID manager to collect said assigned communication identifier from said application after completion of said communicating process so that said collected communication identifier can be reused.

10. The method as set forth in claim 1, wherein the system has a scheduler, said scheduler having a sequencer and stubs, said sequencer managing mapping of said applications and said user tasks that belong thereto and determining a schedule for a group of tasks executed across said nodes, each of said stubs being disposed in each of said nodes and performing said context switching operation for said tasks in each of said node corresponding to the command received from said sequencer, said sequencer sending said schedule to said stubs asynchronously with said context switching operation.

11. A computer program product which causes a distributed-memory multiprocessor system having a plurality of nodes mutually connected by a network, each of said nodes having a CPU and a memory, and a plurality of user tasks which belong to the same application and are executed in different nodes, to execute a method which comprises the steps of:

(a) assigning a transmission resource of a network interface in said node to a user task that will be executed next and starting the execution of said user task when a context switching operation is performed;

(b) reading data written by said user task from said transmission resource, adding to said data a communication identifier that is assigned to an application to which said user task belongs and that identifies a data reception area, and transmitting the resultant data to a reception side node through said network, in said network interface of each transmission side node; and (c) selecting a data reception area for storing data received from another node from a plurality of data receiving areas on the basis of said communication identifier added to said received data and storing said received data in said selected data reception area, in said network interface of each reception side node.

12. The computer program product as set forth in claim 11, wherein the step (a) comprises the step of (a1) assigning a dummy transmission resource to said user task which will be executed next so that said user task can be executed when said network interface does not have a transmission resource that can be assigned to said user task in the context switching operation.

13. The computer program product as set forth in claim 12, wherein the step (a1) is followed by the step of:

(a2) re-determining whether or not said network interface has a transmission resource that can be assigned to said user task when the user task accesses said dummy transmission resource, assigning said transmission resource instead of said dummy transmission resource to said user task when said network interface has the transmission resource that can be assigned to said user task, and continuously executing said user task.

14. The computer program product as set forth in claim 13, wherein the step (a2) is performed only when the attribute of said user task is other than the attribute of Local which represents that said user task does not execute communication using said network interface.

15. The computer program product as set forth in claim 11, wherein the step (a) comprises the step of:
(a1) storing the relation between said communication identifier for said user task which will be executed next and a pointer that points to said data reception area for said user task to a cache of said local network interface on said reception side node; and wherein the step (c) comprises the step of
(c1) retrieving said data reception area for storing said received data from said cache using said communication identifier added to said received data as a key, and selecting said data reception area to which said received data is written.

16. The computer program product as set forth in claim 15, wherein said network interface generates interrupt which causes said OS to store said received data when there is not a cache having the communication identifier identical with said identifier added to said received data.

17. The computer program product as set forth in claim 11, wherein the step (a) is performed by assigning a dummy transmission resource to said user task which will be executed next and starting execution of said user task when said user task has the attribute of Local which represents that said user task does not execute communication using said network interface.

18. The computer program product as set forth in claim 11, wherein said data reception area is a page in a virtual address space and a page table stores the address of said page as a data reception area; and wherein the step (c) is performed by retrieving a page as a data receiving area for storing received data from said page table using said communication identifier added to said received data as a key, and selecting said data reception area, in said network interface of said each reception side node.

19. The computer program product as set forth in claim 11, wherein said method further comprising the step of:
(d) causing a CID manager for managing said communication identifiers to assign a communication identifier to an application before said application performs a communicating process and to collect said assigned communication identifier from said application so that said collected communication identifier can be reused.

20. The computer program product as set forth in claim 1, wherein the system has a scheduler, said scheduler having a sequencer and stubs, said sequencer managing mapping of said applications and said user tasks that belong thereto and determining a schedule for a group of tasks executed across said nodes, each of said stubs being disposed in each of said nodes and performing said context switching operation for said tasks in each of said node corresponding to the command received from said sequencer, said sequencer sending said schedule to said stubs asynchronously with said context switching operation.

* * * * *

UNITED STATES PATENT AND TRADEMARK OFFICE
CERTIFICATE OF CORRECTION

PATENT NO. : 6,092,098
DATED : July 18, 2000
INVENTOR(S) : Hiroyuki Araki, et al.

Page 1 of 1

It is certified that error appears in the above-identified patent and that said Letters Patent is hereby corrected as shown below:

<u>Column 26, claim 20,</u>
Line 1, after "Claim" delete "1" and insert -- 11 --.

Signed and Sealed this

Thirteenth Day of November, 2001

Attest:

Attesting Officer

NICHOLAS P. GODICI
Acting Director of the United States Patent and Trademark Office